US011803936B2

(12) United States Patent
Bonfiglioli et al.

(10) Patent No.: US 11,803,936 B2
(45) Date of Patent: *Oct. 31, 2023

(54) TILE ASSIGNMENT TO PROCESSING CORES WITHIN A GRAPHICS PROCESSING UNIT

(71) Applicant: Imagination Technologies Limited, Kings Langley (GB)

(72) Inventors: Rudi Bonfiglioli, Watford (GB); Richard Broadhurst, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,652

(22) Filed: Oct. 13, 2022

(65) Prior Publication Data

US 2023/0034968 A1   Feb. 2, 2023

Related U.S. Application Data

(63) Continuation of application No. 16/457,978, filed on Jun. 29, 2019, now Pat. No. 11,508,028.

(30) Foreign Application Priority Data

Jun. 29, 2018 (GB) ...................................... 1810776

(51) Int. Cl.
*G06T 1/20* (2006.01)
*G06T 15/00* (2011.01)
(Continued)

(52) U.S. Cl.
CPC .............. *G06T 1/20* (2013.01); *G06F 9/3855* (2013.01); *G06T 15/005* (2013.01); *G06T 17/10* (2013.01)

(58) Field of Classification Search
None
See application file for complete search history.

(56) References Cited

U.S. PATENT DOCUMENTS 5,893,095 A   4/1999  Jain et al.
6,618,046 B1  9/2003  Srinivasa et al.
(Continued)

FOREIGN PATENT DOCUMENTS

CN   1538296 A   10/2004
CN   102279978 A  12/2011
(Continued)

*Primary Examiner* — Anh-Tuan V Nguyen
(74) *Attorney, Agent, or Firm* — Potomac Law Group, PLLC; Vincent M DeLuca

(57) ABSTRACT

A graphics processing unit configured to process graphics data using a rendering space which is sub-divided into a plurality of tiles, the graphics processing unit comprising: a plurality of processing cores configured to render graphics data; cost indication logic configured to obtain a cost indication for each of a plurality of sets of one or more tiles of the rendering space, wherein the cost indication for a set of one or more tiles is suggestive of a cost of processing the set of one or more tiles; similarity indication logic configured to obtain similarity indications between sets of one or more tiles of the rendering space, wherein the similarity indication between two sets of one or more tiles is indicative of a level of similarity between the two sets of tiles according to at least one processing metric; and scheduling logic configured to assign the sets of one or more tiles to the processing cores for rendering in dependence on the cost indications and the similarity indications.

19 Claims, 15 Drawing Sheets

(51) Int. Cl.
*G06T 17/10* (2006.01)
*G06F 9/38* (2018.01)

(56) References Cited

U.S. PATENT DOCUMENTS

| | | | |
|---|---|---|---|
| 9,785,332 | B1 | 10/2017 | Karppanen |
| 9,899,007 | B2 | 2/2018 | Stamoulis et al. |
| 2009/0148003 | A1 | 6/2009 | Chen |
| 2009/0295804 | A1 | 12/2009 | Goel et al. |
| 2009/0303245 | A1 | 12/2009 | Soupikov et al. |
| 2012/0086721 | A1 | 4/2012 | Morovic et al. |
| 2012/0320069 | A1 | 12/2012 | Lee et al. |
| 2013/0229440 | A1 | 9/2013 | MacDonald et al. |
| 2013/0335429 | A1 | 12/2013 | Barringer et al. |
| 2014/0092087 | A1 | 4/2014 | Kazama et al. |
| 2014/0333620 | A1 | 11/2014 | Park et al. |
| 2015/0062154 | A1 | 3/2015 | Ellis et al. |
| 2015/0097850 | A1 | 4/2015 | Craik et al. |
| 2016/0078667 | A1 | 3/2016 | Shim et al. |
| 2016/0098589 | A1 | 4/2016 | Brieu |
| 2016/0163014 | A1 | 6/2016 | Yang et al. |
| 2016/0240000 | A1 | 8/2016 | Fishwick |
| 2016/0247310 | A1 | 8/2016 | Hui et al. |
| 2016/0260241 | A1 | 9/2016 | Jin |
| 2017/0075977 | A1 | 3/2017 | Yadav et al. |
| 2017/0177227 | A1 | 6/2017 | Zhang et al. |
| 2017/0214920 | A1 | 7/2017 | Wang |
| 2017/0262952 | A1* | 9/2017 | Sarna .................. G06T 1/20 |
| 2017/0309027 | A1 | 10/2017 | Kleen et al. |
| 2018/0137677 | A1 | 5/2018 | Jeong et al. |
| 2018/0144538 | A1 | 5/2018 | Jeong et al. |
| 2018/0174349 | A1* | 6/2018 | Yang ................. G06T 11/40 |
| 2018/0276044 | A1* | 9/2018 | Fong ................. G06F 9/4881 |
| 2018/0364888 | A1 | 12/2018 | Balzer et al. |
| 2019/0197760 | A1 | 6/2019 | Cho et al. |

FOREIGN PATENT DOCUMENTS

| | | |
|---|---|---|
| EP | 2648107 A1 | 10/2013 |
| EP | 3185217 A2 | 6/2017 |
| GB | 2494903 A | 3/2013 |
| GB | 2540227 A | 1/2017 |
| WO | 2013130030 A1 | 9/2013 |

* cited by examiner

TILE ASSIGNMENT TO PROCESSING CORES WITHIN A GRAPHICS PROCESSING UNIT

CROSS-REFERENCE TO RELATED APPLICATIONS AND CLAIM OF PRIORITY

This application is a continuation under 35 U.S.C. 120 of copending application Ser. No. 16/457,978 filed Jun. 29, 2019, now U.S. Pat. No. 11,508,028, which claims foreign priority under 35 U.S.C. 119 from United Kingdom Application No. 1810776.3 filed Jun. 29, 2018.

FIELD

The present disclosure relates to approaches to assigning tiles, or sets of tiles, to processing cores within a graphics processing unit.

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). To give some examples, a tile may cover a 16×16 block of pixels or a 32×32 block of pixels of an image to be rendered. As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase, a tile can be rendered by processing those graphics data items which are determined to be present within that tile (without needing to process graphics data items which were determined in the geometry processing phase to not be present within the particular tile). The graphics data items may represent geometric shapes, which describe surfaces of structures in the scene, and which are referred to as "primitives". A common primitive shape is a triangle, but primitives may be other 2D shapes or may be lines or points also. Objects can be composed of one or more (e.g. hundreds, thousands or millions) of such primitives.

FIG. 1 shows some elements of a graphics processing system 100 which may be used to render an image of a 3D scene. The graphics processing system 100 comprises a graphics processing unit (GPU) 102 and two portions of memory $104_1$ and $104_2$. The two portions of memory $104_1$ and $104_2$ may, or may not, be parts of the same physical memory.

The GPU 102 comprises a pre-processing module 106, a tiling unit 108 and rendering logic 110, wherein the rendering logic 110 comprises a fetch unit 112 and processing logic 113 which includes one or more processing cores 114. The rendering logic 110 is configured to use the processing cores 114 to implement hidden surface removal (HSR) and texturing and/or shading on graphics data (e.g. primitive fragments) for tiles of the rendering space.

The graphics processing system 100 is arranged such that a sequence of primitives provided by an application is received at the pre-processing module 106. In a geometry processing phase, the pre-processing module 106 performs functions such as geometry processing including clipping and culling to remove primitives which do not fall into a visible view. The pre-processing module 106 may also project the primitives into screen-space. The primitives which are output from the pre-processing module 106 are passed to the tiling unit 108 which determines which primitives are present within each of the tiles of the rendering space of the graphics processing system 100. The tiling unit 108 assigns primitives to tiles of the rendering space by creating control streams (or "display lists") for the tiles, wherein the control stream for a tile includes indications of primitives which are present within the tile. The control streams and the primitives are outputted from the tiling unit 108 and stored in the memory $104_1$.

In a rendering phase, the rendering logic 110 renders graphics data for tiles of the rendering space to generate values of a render, e.g. rendered image values. The rendering logic 110 may be configured to implement any suitable rendering technique, such as rasterisation or ray tracing to perform the rendering. In order to render a tile, the fetch unit 112 fetches the control stream for a tile and the primitives relevant to that tile from the memory $104_1$. For example, the rendering unit may implement rasterisation according to a deferred rendering technique, such that one or more of the processing core(s) 114 are used to perform hidden surface removal to thereby remove fragments of primitives which are hidden in the scene, and then one or more of the processing core(s) 114 are used to apply texturing and/or shading to the remaining primitive fragments to thereby form rendered image values. Methods of performing hidden surface removal and texturing/shading are known in the art. The term "fragment" refers to a sample of a primitive at a sampling point, which is to be processed for rendering pixels of an image. In some examples, there may be a one to one mapping of sample positions to pixels. In other examples there may be more sample positions than pixels, and this oversampling can allow for higher quality rendering of pixel values, e.g. by facilitating anti-aliasing and other filtering that may be applied to multiple fragments for rendering each of the pixel values. The texturing and/or shading performed on the fragments which pass the HSR stage determines pixel colour values of a rendered image which can be passed to the memory $104_2$ for storage in a frame buffer. Texture data may be received at the rendering logic 110 from the memory $104_1$ in order to apply texturing to the primitive fragments, as is known in the art. Shader programs may be executed to apply shading to the primitive fragments. The texturing/shading process may include applying further processing to the primitive fragments (e.g. alpha blending and other processes), as is known in the art in order to determine rendered pixel values of an image. The rendering logic 110 processes primitives in each of the tiles and when the whole image has been rendered and stored in the memory $104_2$, the rendered image can be outputted from the graphics processing system 100 and used in any suitable manner, e.g. displayed on a display or stored in memory or transmitted to another device, etc.

In some systems, a particular processing core can be used to perform hidden surface removal at one point in time and texturing/shading at another point in time. In some other systems, some of the processing cores are dedicated for performing hidden surface removal whilst others of the processing cores are dedicated for performing texturing and/or shading on primitive fragments.

The graphics processing system 100 described above is a deferred rendering system because the rendering logic 110 is configured to perform the HSR processing on a primitive fragment before the texturing/shading processing is applied to the primitive fragment. Other graphics processing systems are not deferred rendering system in the sense that they are configured to perform the texturing and/or shading of primitive fragments before the HSR is performed on those primitive fragments. Deferred rendering systems avoid the processing involved in applying texturing and/or shading to at least some of the primitive fragments which are removed by the hidden surface removal process.

If the rendering logic 110 includes more than one processing core 114 then the processing cores can process different data in parallel, thereby improving the efficiency of the rendering logic 110. In some systems, the tiles are assigned to processing cores of the rendering logic 110, such that the graphics data for rendering a particular tile is processed in a single processing core. The graphics data for rendering a different tile may be processed by a different, single processing core. Processing a particular tile on a single processing core (rather than spreading the processing of the particular tile across multiple cores) can have benefits such as an improved cache hit rate. Multiple tiles may be assigned to the same processing core, which can be referred to as having "multiple tiles in flight". When all of the tiles for a render have been processed by the rendering logic 110, the render is complete. Then the results of the render (e.g. a rendered frame) can be used as appropriate (e.g. displayed on a display or stored in a memory or transmitted to another device, etc.), and the rendering logic 110 can process tiles of a subsequent render.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

According to one aspect of the present disclosure there is provided A graphics processing unit configured to process graphics data using a rendering space which is sub-divided into a plurality of tiles, the graphics processing unit comprising: a plurality of processing cores configured to render graphics data; cost indication logic configured to obtain a cost indication for each of a plurality of sets of one or more tiles of the rendering space, wherein the cost indication for a set of one or more tiles is suggestive of a cost of processing the set of one or more tiles; similarity indication logic configured to obtain similarity indications between sets of one or more tiles of the rendering space, wherein the similarity indication between two sets of one or more tiles is indicative of a level of similarity between the two sets of tiles according to at least one processing metric; and scheduling logic configured to assign the sets of one or more tiles to the processing cores for rendering in dependence on the cost indications and the similarity indications.

The scheduling logic may be configured to assign the next set of one or more tiles to the processing cores according to a first scheduling order set by the cost indications if the similarity indications do not indicate that there is another set of one or more tiles yet to be assigned to the processing cores that has a level of similarity with the set of one or more tiles most recently assigned to the processing cores above a specified threshold.

The similarity indication logic may be configured to assign a group of one or more similarity indications to each of a plurality of sets of one or more tiles, each similarity indication in a group being indicative of a level of similarity between that set of one or more tiles and another set of one or more tiles.

The scheduling logic may be configured to:
assign the next set of one or more tiles to the processing cores according to a first scheduling order set by the cost indications if the group of similarity indications for the set of one or more tiles most recently assigned to the processing cores does not indicate that there is a level of similarity above a specified threshold between that set of one or more tiles and another set of one or more tiles yet to be assigned to the processing cores; and
if the group of similarity indications for the set of one or more tiles most recently assigned to the processing cores indicates there is a level of similarity above the specified threshold between that set of one or more tiles and one or more other sets of one or more tiles yet to be assigned to the processing cores, assign as the next set of one or more tiles to the processing cores one of those other sets of one or more tiles.

The similarity indication logic may be configured to assign to each of the plurality of sets of one or more tiles a plurality of similarity indications indicative of a level of similarity between that set of one or more tiles and other sets of one or more tiles located within a localised region of that set of one or more tiles.

The similarity indication logic may be configured to assign a single similarity indication to each of a plurality of sets of one or more tiles, the similarity indication assigned to each set of one or more tiles being indicative of a level of similarity between that set of one or more tiles and another set of one or more tiles specified according to a spatial order of the tiles within the rendering space.

The scheduling logic may be configured to assign a next set of one or more tiles to the processing cores according to a first scheduling order set by the cost indications or a second scheduling order set by the spatial order of the tiles in dependence on the similarity indication assigned to the set of one or more tiles most recently assigned to the processing cores.

The scheduling logic may be configured to:
assign the next set of one or more tiles to the processing cores according to the first scheduling order if the similarity indication assigned to the set of one or more tiles most recently assigned to the processing cores indicates a level of similarity between that set of one or more tiles and the other set of one or more tiles specified according to the spatial order of the tiles below a specified threshold; and
to next assign to the processing cores the set of one or more tiles specified by the spatial ordering of the tiles if the similarity indication assigned to the set of one or more tiles most recently assigned to the processing cores indicates a level of similarity between that set of one or more tiles and the set of one or more tiles specified according to the spatial order of the tiles above the specified threshold.

The similarity indication logic may be configured to determine the similarity indications.

The at least one processing metric might include a processing resource used to render a set of one or more tiles, and the similarity indication logic may be configured to determine a similarity indication between two sets of one or more tiles based on a level of sharing of the processing resource between the two sets of one or more tiles.

The processing resource may be a set of one or more shader programs referenced by a set of one or more tiles.

The similarity indication logic may be configured to determine the level of sharing of the processing resource from the number of shader programs referenced by both of the two sets of one or more tiles.

The processing metric may include graphical data content comprising at least one of: (i) primitives which are present within a set of one or more tiles, and (ii) textures which are to be used to render a set of one or more tiles.

The similarity indication logic may be configured to determine a similarity indication between two sets of one or more tiles from the cost indications for those two sets of one or more tiles.

The cost indication logic may be configured to determine the cost indications for the sets of one or more tiles of the rendering space.

The cost indication logic may be configured to determine a cost indication for a tile of the rendering space by combining scores associated with primitives which are present in the tile, wherein the score associated with a primitive is dependent upon an object type of an object of which the primitive is a part.

The cost indication logic may be configured to determine a cost indication for a tile of the rendering space based on one or more of the following factors:
  (i) a number of primitives in the tile;
  (ii) object types associated with the primitives in the tile;
  (iii) tile coverage area of the primitives in the tile;
  (iv) characteristics of one or more shader programs which are to be executed for rendering the primitives in the tile;
  (v) a user input; and
  (vi) a processing cost of a corresponding tile in a previous render.

The characteristics of a shader program may include one or more of:
  (i) a length of the shader program;
  (ii) an amount of resources or registers used by the shader program;
  (iii) whether the shader program includes conditional flow control;
  (iv) whether the shader program includes loops for which the number of repetitions is undefined at compile time; and
  (v) an amount of memory reads and/or writes used in the shader program.

The sets of one or more tiles may each comprise only a single tile.

The sets of one or more tiles may each comprise a plurality of tiles.

The cost indication logic may be configured to:
  obtain a respective cost indication for each of the tiles of a set of tiles; and
  determine the cost indication for the set of tiles based on the cost indications of the tiles within that set.

According to another aspect of the present disclosure there is provided a method of processing graphics data in a graphics processing system which comprises a plurality of processing cores configured to render graphics data, the graphics processing system being configured to use a rendering space which is sub-divided into a plurality of tiles, the method comprising:
  obtaining a cost indication for each of a plurality of sets of one or more tiles of the rendering space, wherein the cost indication for a set of one or more tiles is suggestive of a cost of processing the set of one or more tiles;
  obtaining similarity indications between sets of one or more tiles of the rendering space, wherein the similarity indication between two sets of one or more tiles is indicative of a level of similarity between the two sets of tiles according to at least one processing metric; and
  assigning the sets of one or more tiles to the processing cores for rendering in dependence on the cost indications and the similarity indications.

The graphics processing unit may be embodied in hardware on an integrated circuit.

There may be provided computer program code for performing a method as described herein.

There may be provided an integrated circuit definition dataset that, when processed in an integrated circuit manufacturing system, configures the integrated circuit manufacturing system to manufacture a graphics processing unit according to any of the examples herein.

There may be provided an integrated circuit manufacturing system comprising:
  a non-transitory computer readable storage medium having stored thereon a computer readable description of a graphics processing unit according to any of the examples herein;
  a layout processing system configured to process the computer readable description so as to generate a circuit layout description of an integrated circuit embodying the graphics processing unit; and
  an integrated circuit generation system configured to manufacture the graphics processing unit according to the circuit layout description.

BRIEF DESCRIPTION OF THE DRAWINGS

Examples will now be described in detail with reference to the accompanying drawings in which.

Figure 1:
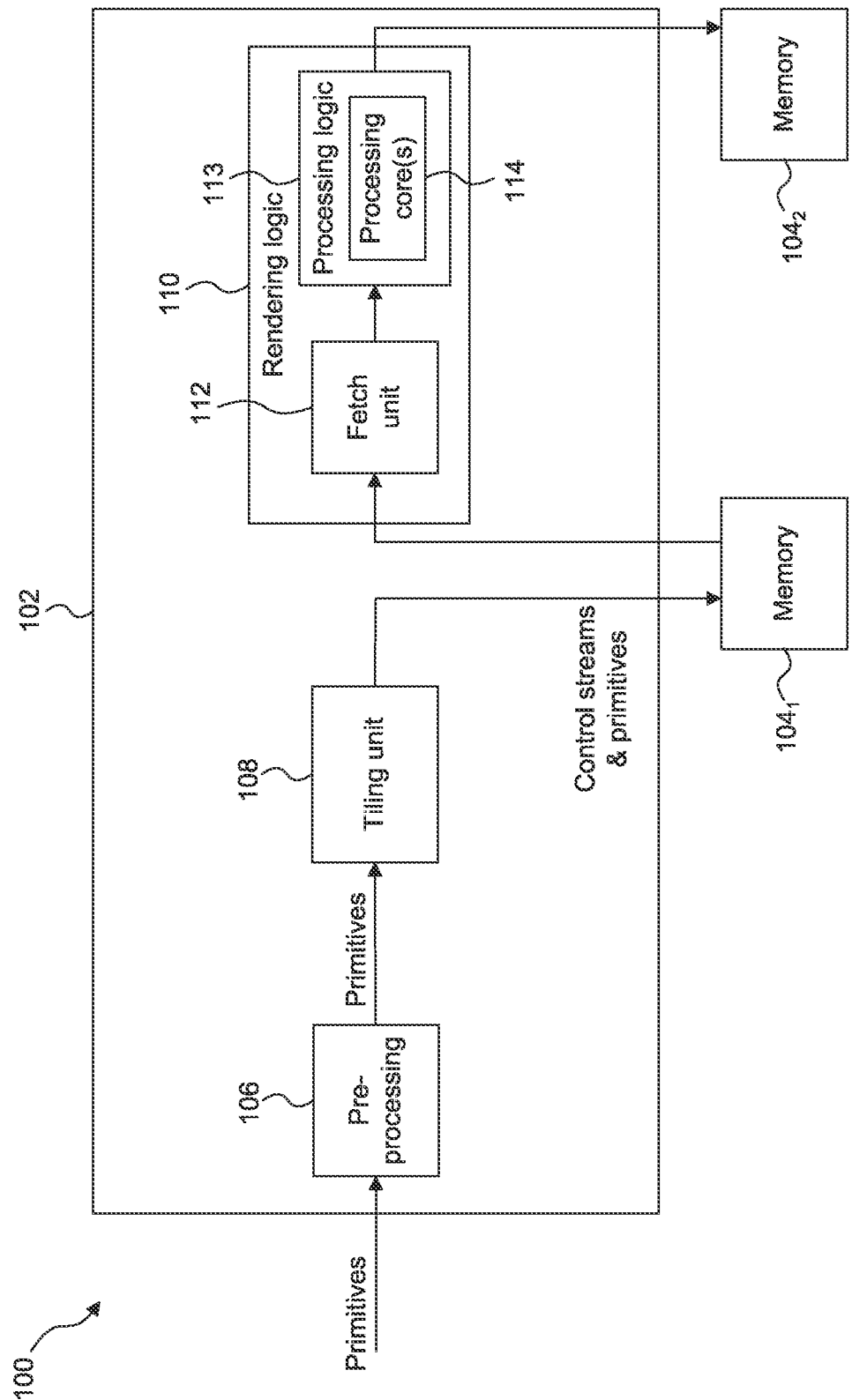
FIG. 1 shows a prior art graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

In the graphics processing system shown in FIG. 1, increasing the number of processing cores will tend to improve the performance of the graphics processing unit in terms of reducing the time taken to process all of the tiles of a render because the processing of the tiles can be divided amongst the processing cores. However, increasing the number of processing cores tends to increase the size (i.e. silicon area) of the GPU and the peak power consumed by the GPU.

Figure 2A:
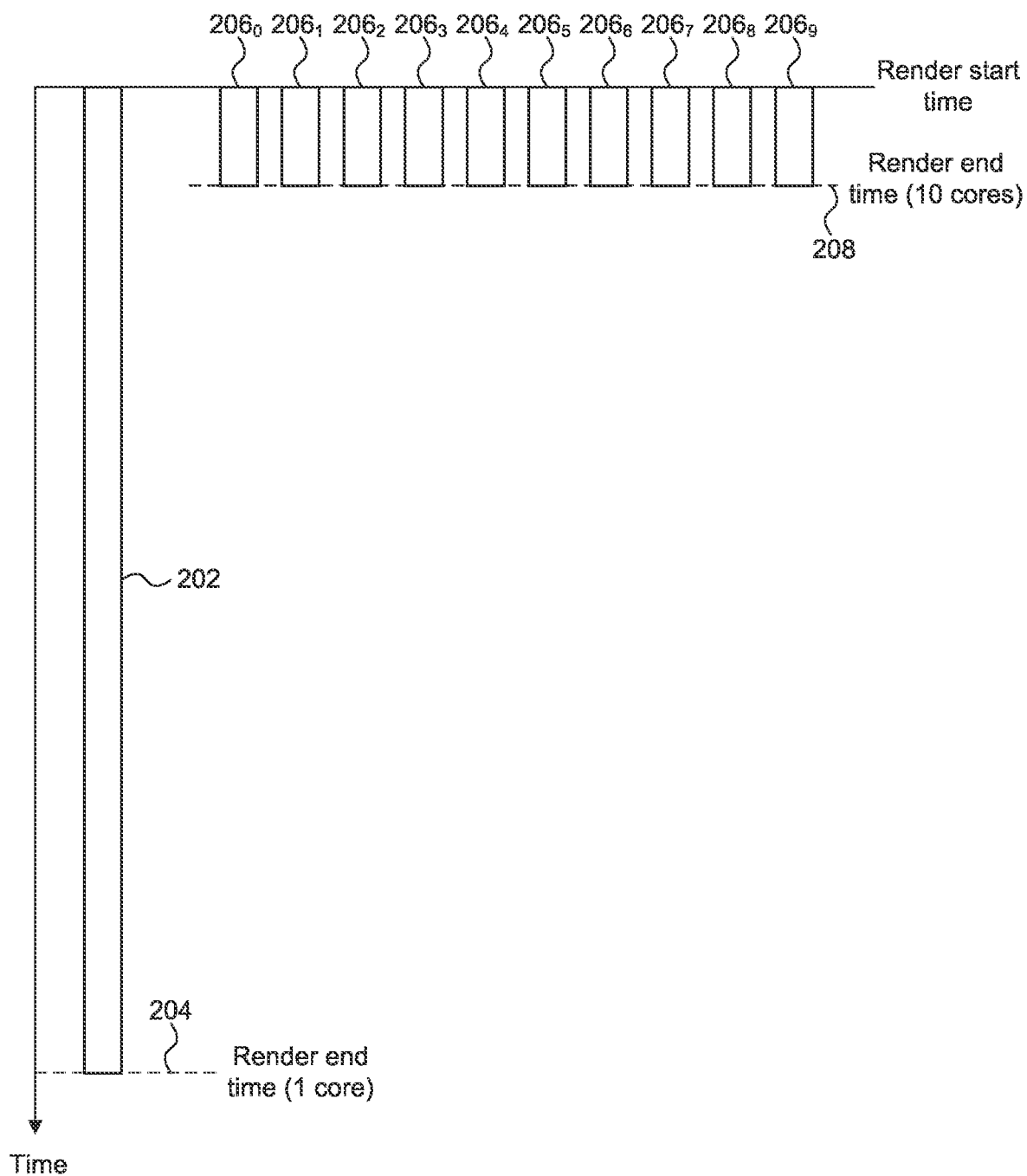
FIG. 2a is a graph illustrating an idealised tile workload distribution on a 1 core GPU and a 10 core GPU.

FIG. 2a is a graph illustrating an idealised tile workload distribution on a 1 core GPU and a 10 core GPU. The vertical axis in FIG. 2a has time running downwards, from a render start time. The block 202 represents the work performed by a single processing core if the GPU 102 uses one processing core 114 for rendering all of the tiles of the rendering space. In this example, the render end time is shown at 204. In this idealised example, the blocks $206_0$ to $206_9$ represent the work performed by the processing cores if the GPU 102 uses ten processing cores 114 for rendering all of the tiles of the rendering space. In this example, the render end time is shown at 208. In this idealised example, each tile incurs the same processing cost, such that the render time with one core is ten times as long as the render time with ten cores.

As an example, consider a frame which consists of only a single render. This render may be 640×480 pixels in size and therefore there may be 300 tiles (arranged as a 20×15 block of tiles) in the frame, where the tiles are each 32×32 pixels in size. If all tiles take an equal amount of time 'T' to process, then a one cluster GPU can be expected to take a time of approximately 300 T to complete the render; whereas a ten cluster GPU can be expected to take a time of approximately 30 T to complete the render. Therefore in this idealised case, a ten cluster GPU is ten times quicker than a one cluster GPU at completing a render. It is noted that the terms "cluster" and "core" may be used interchangeably herein, both of which refer to a processing unit (including processing components such as arithmetic logic units) which is configured to perform processing operations on incoming data. Furthermore, the terms "frame" and "image" may be used interchangeably herein.

Figure 2B:
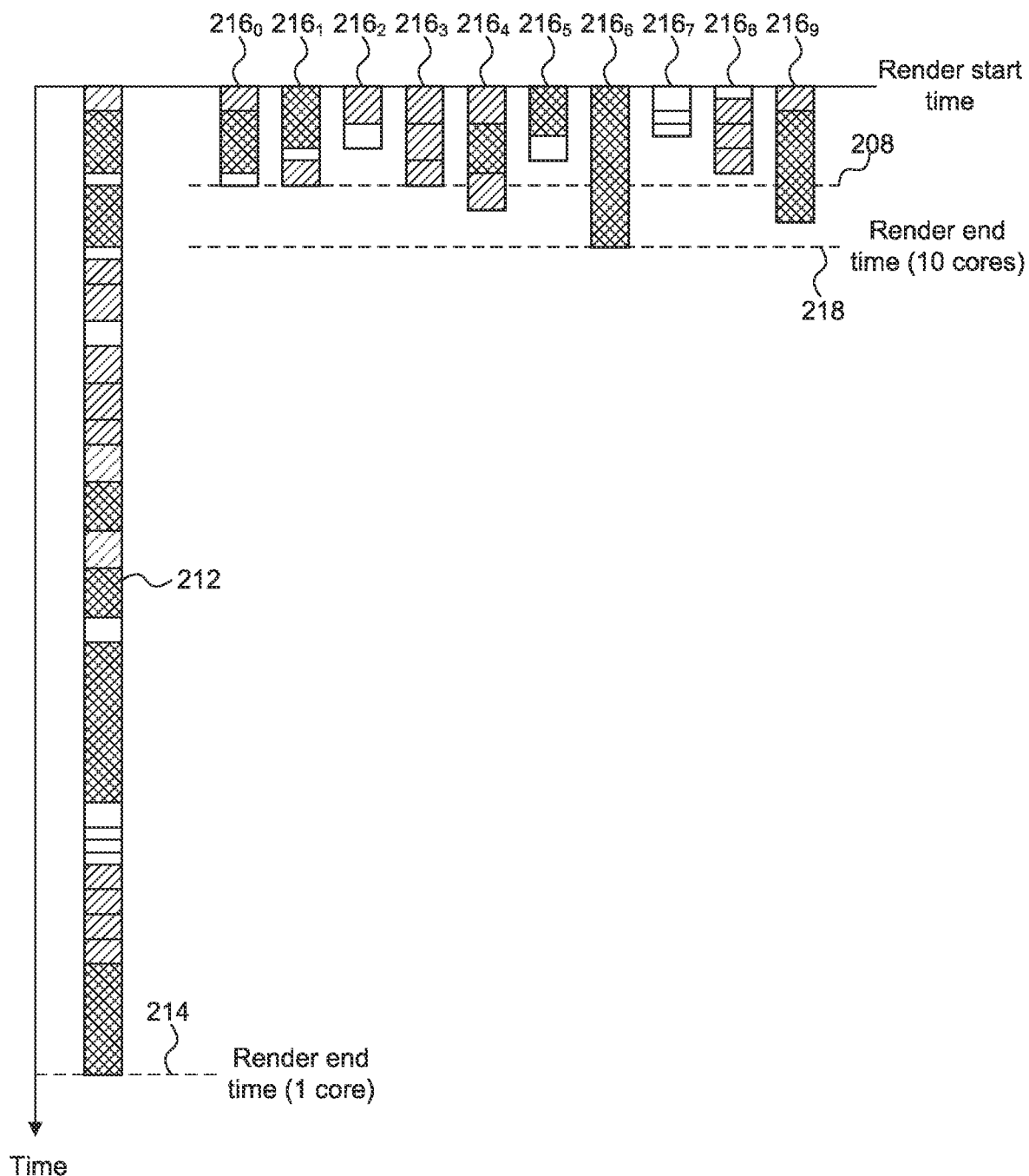
FIG. 2b is a graph illustrating a tile workload distribution on a 1 core GPU and a 10 core GPU with small variations in the costs of the tile workloads.

However, the perfectly balanced workload shown in FIG. 2a is rarely what happens in real graphics workloads. Allowing for even a small random variation in the work of each tile can significantly modify the overall runtime of the frame on multiple cores even when the total workload in the frame remains constant as shown in FIG. 2b. FIG. 2b is a graph illustrating a tile workload distribution on a 1 core GPU and a 10 core GPU with small variations in the costs of the tile workloads. In FIG. 2b a third of the tiles are 'low cost' tiles (shown as unhatched workloads), a third of the tiles are 'medium cost' tiles (shown with diagonal hatching) and a third of the tiles are 'high cost' (shown with cross hatching). The 'cost' of a tile may refer to the amount of time taken to process the tile (as in the example shown in FIG. 2b). In other contexts, the cost of a tile may refer to the amount of processing resources used, the amount of data transferred to/from memory, or the processing power used for processing the tile, etc.

In FIG. 2b, the block 212 represents the work performed by a single processing core if the GPU 102 uses one processing core 114 for rendering all of the tiles of the rendering space. In this example, the render end time is shown at 214, which is the same as render end time 204 shown in FIG. 2a. In this example, the blocks $216_0$ to $216_9$ represent the work performed by the processing cores if the GPU 102 uses ten processing cores 114 for rendering all of the tiles of the rendering space. In this example, the render end time is shown at 218. The dashed line 208 shows the render end time in the idealised example of FIG. 2a. A render is complete when all of the tiles of the render have been processed. Before a current render can begin execution, a previous render may need to be completed, i.e. the current render waits for the previous render to complete before commencing execution of tiles of the current render. It can be seen in FIG. 2b that the variation in the processing costs of the tiles results in a longer render time when multiple cores are used, i.e. render end time 218 is after idealised render end time 208. A render may be for generating pixel values of a frame, such that completing the render involves storing pixel values in a framebuffer to represent a frame, which can then be used in any appropriate manner, e.g. displayed on a display, stored or transmitted, etc. In other examples, a render may not result in a finished frame, e.g. the render may be a sub-render which can be used in a subsequent rendering process for generating a frame. For example, a sub-rendering could be a 'render to texture' such that the result of the rendering is a texture which can then be applied to a subsequent rendering process for generating an image. As other examples, a sub-rendering may be a shadow map or an environment map for subsequent use in rendering a frame.

GPUs with real applications may typically run many tiles per render (e.g. 2000 tiles) and may contain many renders (e.g. 20). This gives a lot of scope for random variation beyond that shown in FIG. 2b. When tiles are individually assigned to particular processing cores, there may be a random probability of consecutively executing slow tiles (i.e. tiles with high processing costs) on a single processing core. In systems which assign groups of more than one spatially-adjacent tile to a processing core, there may be a worse than random probability of consecutively executing slow tiles being assigned to a single core. As described in more detail below, this is because slow tiles typically correspond to complex regions of the scene/objects, so since the tiles in the group are spatially-adjacent then if one tile in the group is expensive then it is likely that the other tiles in the group will also be expensive. The slowest core represents a limiting factor for the render and therefore the core that finishes last determines the time it takes to execute the render and by extension both the framerate of the application and the efficiency of the hardware. Averaged out over many thousands of tiles it might be expected that a random allocation scheme would average out to be reasonably well balanced, however that is often not true. There are three fundamental reasons for this:

1) By design, tile based GPUs often aim to process spatially local tiles on the same cluster in order to maximise the efficiency of caches. Spatially local tiles commonly share lots of data, including things like textures, instructions, shaders, etc. which means it may be beneficial from a cache coherency perspective to keep multiple neighbouring tiles within the same cluster. This tends to mean that the worst case scheduling of back to back expensive tiles on a single core is not only possible but positively reinforced.

2) The workload in graphics applications such as games is typically not evenly distributed across the frame. Some regions of the frame may contain scene objects or effects that are particularly time consuming to compute (i.e. have a high processing cost). Common examples are translucent objects, punch-through objects (objects with transparent areas defined by textures or shaders), effects that require multiple layers to be blended together and some shader effects that are computationally expensive but applied only to some objects/regions of the scene. It is noted that punch through is a technique where an object may or may not have regions that are transparent, and the presence or location of these transparent regions is not known until runtime when visibility is either calculated or fetched from a texture. A common and very expensive example is foliage where leaves are drawn as simple polygons (e.g. rectangles or triangles) represented by one or more primitives, and the leaf shape is generated by making some parts of the polygon invisible, e.g. by making some primitive fragments invisible within the one or more primitives representing the polygon.

3) An expensive tile that is processed towards the end of a render may cause a significant increase in the time taken for the render, if there are too few other tiles remaining to allow other processing cores to remain busy for the duration of the processing of the expensive tile. Allowing these other cores to become idle is an inefficient use of the processing resources that increases the run time of the whole render.

Due to the nature of realtime graphics a constant stream of renders is performed and the random variations of run time can result in the undesirable effect of creating a stuttering effect in the output presented to an end user. Stuttering occurs when a screen updates the display at a particular frequency (e.g. 60 Hz). If the frame to frame variations mean that sometimes an updated frame is available before the screen updates (resulting in smooth motion), but at other times it is not available (resulting in a previous frame being repeated) there will be a perceptible stuttering in the final output images.

One approach to improve the scheduling of work to processing cores is described in co-pending application GB1700562.0. In this approach, work is scheduled for processing cores of a multi-core GPU based on cost estimates for the different items of work. In particular, for each tile of a render a cost indication is determined, and then tiles can be assigned to the processing cores based on the cost indications. A cost indication for a tile indicates, or at least suggests, a cost of processing the tile. For example, a cost indication may indicate a likely cost of processing the tile. Scheduling the tiles so that higher cost tiles are processed before lower cost tiles can reduce the likelihood of starting the processing of a high cost tile near the end of a render. As described above, starting to process high cost tiles near the end of a render can be particularly detrimental to the overall render time, so reducing the likelihood of this occurring can improve (i.e. reduce) the average render time. As mentioned above, the cost indications can be used to schedule sets of tiles with relatively high cost indications before sets of tiles with relatively low cost indications. A high cost indication indicates a high processing cost, and a low cost indication indicates a low processing cost.

One potential disadvantage of scheduling tiles to processing cores based on cost indications alone is that consecutive tiles assigned to the processing cores may be from disparate regions of the rendering space. In other words, consecutively assigned tiles may not be local to each other within the rendering space. This in turn can cause the benefits of cache coherency described above to be eroded, or lost. It has been appreciated by the inventors that, in some situations, the loss of cache coherency from this scheduling approach can cause the performance of the processing cores in rendering all the tiles of the rendering space to be worse than if a simpler spatial-order scheduling scheme were used in which tiles are assigned to cores according to a spatial ordering of the tiles (e.g. a Peano curve, Morton order (i.e. Z-order) or N-order. This is illustrated schematically in FIGS. 3 to 7.

Figures 3, 4:
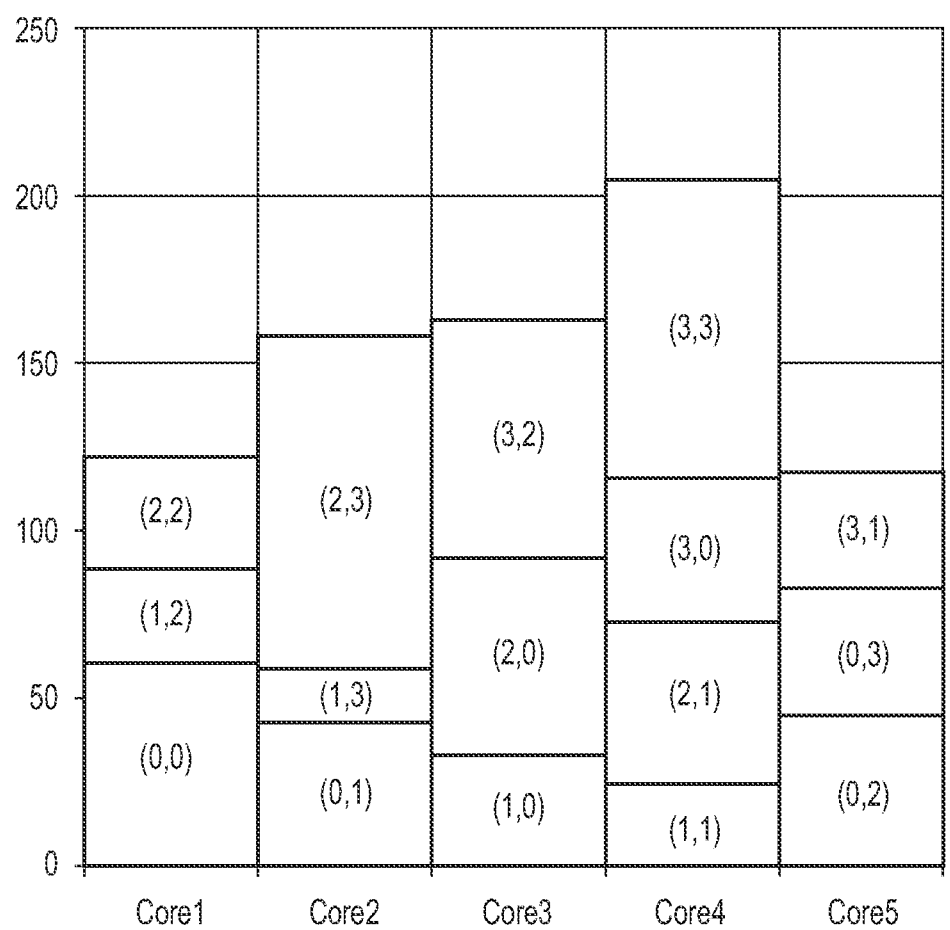
FIG. 3 is a table illustrating the number of processing cycles to render each tile of an exemplary 4×4 tile grid.
FIG. 4 is a graph illustrating the timing of execution of the set of 4×4 tiles on a 5-core GPU when a scheduling method based on a spatial order of the tiles is used to assign the tiles to the GPU cores.

FIG. 3 is a table showing example values for the time required to process each tile of a 4×4 tile block. The values are schematic, and expressed in arbitrary units of time T. Each entry in the table corresponds to a respective tile in the tile block, with the position of each entry within the table corresponding to the position of the tile within the tile block; i.e. the top-left table entry at position (0,0), which has a value of 60, denotes the time taken to process the top-left tile of the tile block (at position (0,0)); the bottom-right table entry (position (3,3) contains the time taken to process the bottom-right tile of the tile block (at position (3,3)), etc.

FIG. 4 shows the timing of execution of the 4×4 block of tiles (having the processing times shown in FIG. 3) on a 5-core GPU to render the tiles when the tiles are allocated to the processing cores using a spatial-order scheduling scheme (specifically, when tiles are assigned to the cores following an N-order of the tiles). The time required to render the 4×4 block of ties is 207 T. Each tile in FIG. 4 is identified by its position within the block, with the time taken to process a given tile specified in the table in FIG. 3 by the entry having the same corresponding position (e.g., the time taken to process tile (1,2) within the block is given by the tile value at entry (1,2) in the table shown in FIG. 3.

Figure 5:
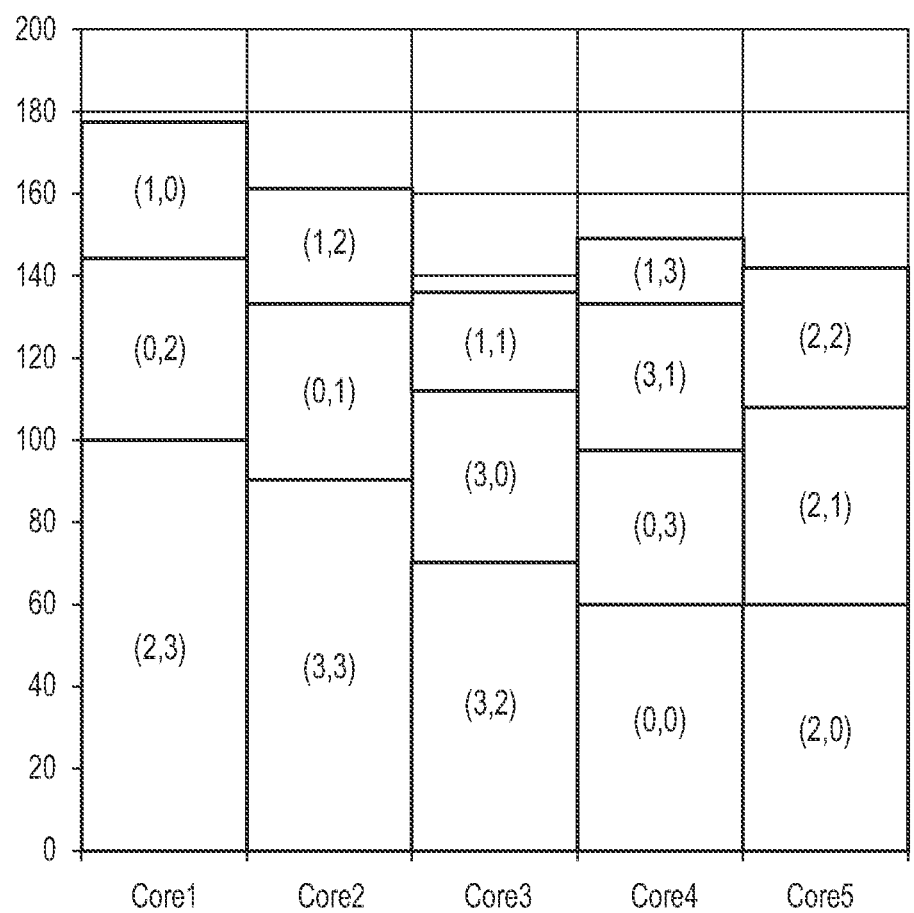
FIG. 5 is a graph illustrating the timing of execution of the set of 4×4 tiles on a 5-core GPU when a scheduling method based on cost indications is used to assign the tiles to the GPU cores.

FIG. 5 shows the timing of execution of the same 4×4 block of tiles on the same 5-core GPU when the tiles are allocated to the processing cores using a priority-based scheduling scheme that prioritises the allocation of higher-processing cost tiles over lower-processing cost tiles. Each tile in FIG. 5 is again identified by its position within the block. In this example, the processing cost of processing a tile is the time taken to process the tile as specified by the table in FIG. 3. A higher-processing cost tile therefore takes longer to process than a lower-processing cost tile. The priority-based scheduling scheme may be implemented with multiple tiles in flight, which is to say that a tile can be scheduled for allocation to a processing core before that processing core has finished processing its previously allocated tile. This can mean that, in some circumstances, tiles might be processed in an order that differs from the order in which they are scheduled or selected for processing. It can be seen that, using this priority-based allocation scheme, the time required to render the 4×4 block of tiles is reduced to 177 T.

Though FIGS. 4 and 5 suggest that the priority-based scheduling scheme reduces the time to render the 4×4 set of tiles compared to the spatial-order scheduling scheme, the effects of cache-coherency on processing time are ignored in these figures.

To estimate the effects of cache coherency, it is assumed that a tile assigned to a core immediately after a previous tile belonging to the same 'tile group' will benefit from the sharing of data (e.g. texture data) with that previous tile, e.g. the reuse of data stored in a cache that is shared amongst the cores. In this example, a 'tile group' is taken to be a 2×2 quad of tiles which coincides with the 2×2 tile group the N-order repeats over. It is further assumed that a tile that benefits from sharing cache data with a previously assigned tile will have a 15% reduction in processing time compared to the processing time for that tile if it only shared an insignificant amount of cache data with the previously assigned tile. The value of 15% has been determined empirically to be a suitable figure for representing the benefits of cache coherency based on experimental observations by the applicant over many different renders.

Figure 6:
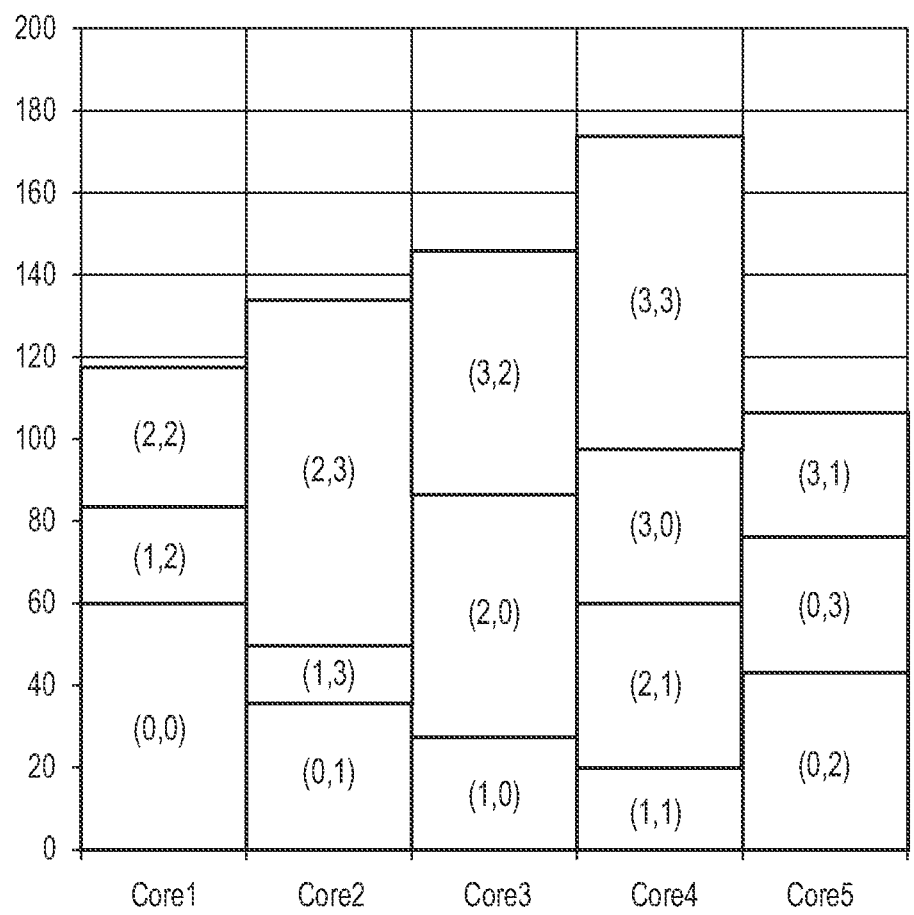
FIG. 6 is a graph illustrating the timing of execution of the set of 4×4 tiles on a 5-core GPU when a scheduling method based on a spatial order of the tiles is used to assign the tiles to the GPU cores and an estimate of processing savings due to cache coherency is taken into account.

FIG. 6 shows the timing of execution of the same 4×4 tile block by the 5-core GPU following the same spatial-order scheduling scheme as per FIG. 4 (specifically, when tiles are assigned to the cores following an N-order of the tiles), but with the above-assumed effects of cache coherency taken into account. Each tile in FIG. 6 is again identified by its position within the block. With the effects of cache coherency taken into account, the processing time to render the 4×4 tile block is estimated to be 175 T.

Figure 7:
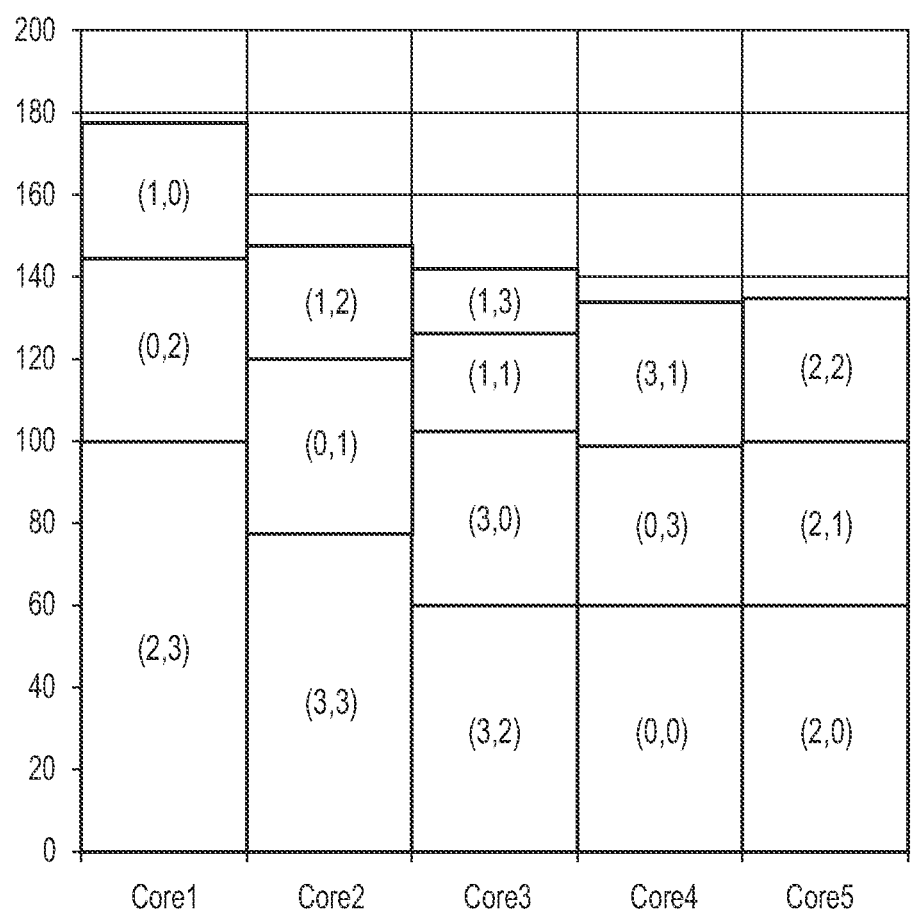
FIG. 7 is a graph illustrating the timing of execution of the set of 4×4 tiles on a 5-core GPU when a scheduling method based on cost indications is used to assign the tiles to the GPU cores and an estimate of processing savings due to cache coherency is taken into account.

FIG. 7 shows the timing of execution of the same 4×4 tile block by the 5-core GPU following the same priority-based scheduling scheme as per FIG. 5, but with the above-assumed effects of cache coherency taken into account. Each tile in FIG. 7 is again identified by its position within the block. In this particular example, the priority-based scheduling scheme breaks the spatial ordering of the tiles and does not benefit from any significant amount of cache coherency. The time to render the 4×4 tile block is therefore the same (177 T) as when the effects of cache-coherency are ignored, and greater than the time to render the tiles using the spatial-order scheduling scheme when the effects of cache-coherency are considered.

Though the above examples are based on assumptions on the benefits of cache coherency, they serve to illustrate the potential drawbacks of the priority-based scheduling when rendering certain scenes.

In the examples described herein, work is scheduled for processing cores of a multi-core GPU based on both cost estimates and similarity indications for different items of work. In particular, cost indications for each of a plurality of sets of one or more tiles are determined in addition to similarity indications between the sets of one or more tiles. The sets of one or more tiles can then be assigned to the processing cores for rendering in dependence on the cost indications and the similarity indications. A cost indication for a set of one or more tiles indicates, or at least suggests, a cost of processing that set of one or more tiles. For example, a cost indication may indicate a likely cost of processing the set of one or more tiles. A similarity indication between two sets of one or more tiles indicates, or at least suggests, a level of similarity between the two sets of tiles. The level of similarity may be defined with respect to at least one processing metric associated with processing the set of one or more tiles.

The use of similarity indications enables a scheduling scheme that assigns tiles to cores based only on their cost indications to be departed from when a tile that has been assigned to a processing core is found to have a relatively high level of similarity with a tile that has yet to be assigned to a core. When this happens, that tile of relatively high similarity that has yet to be assigned a processing core can be chosen as the tile next assigned to a processing core instead of the tile that would have been assigned to the processing cores next based on a consideration of the cost indication alone. This enables the tile next assigned to the processing cores to benefit from sharing at least some cache data with the previously assigned tile. When an unassigned tile having a relatively high similarity with a recently-assigned tile cannot be found, the scheduling scheme based on cost indications can be reverted to for assigning the next tile to the processing cores. This approach of assigning a tile to a processing core based on either processing cost or similarity indications enables the benefits of prioritising the assignment of more complex tiles over less complex tiles to be realised whilst reducing the potential effects of reduced cache coherency that can arise from assigning tiles to cores based on cost indications alone.

In this description, a high cost indication indicates a high processing cost, and a low cost indication indicates a low processing cost. Similarly, a high similarity indication indicates a high level of similarity, and a low similarity indication indicates a low level of similarity.

Figure 8:
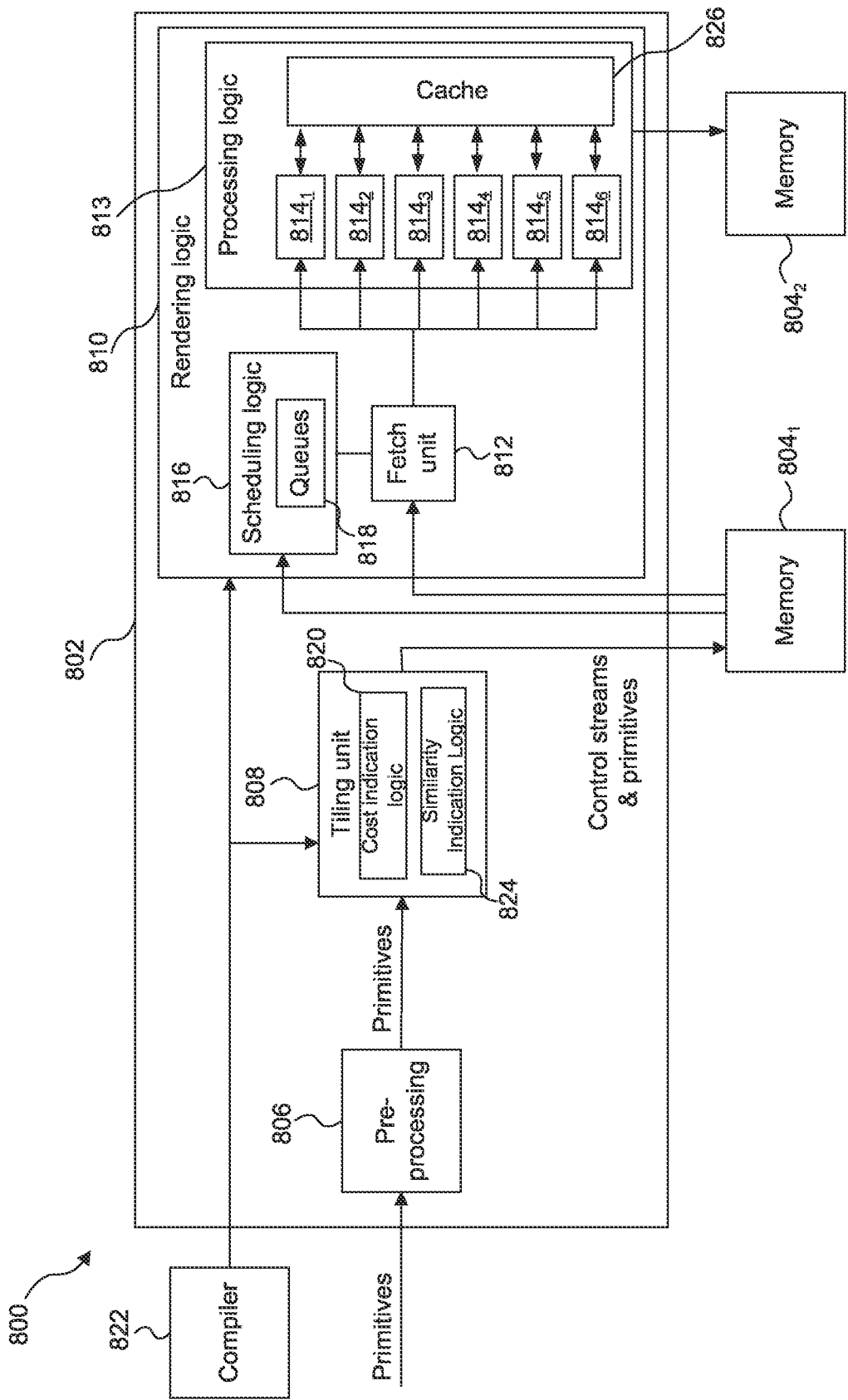
FIG. 8 shows a graphics processing system.

FIG. 8 shows some elements of a graphics processing system 800 which may be used to render an image of a 3D scene. The graphics processing system 800 comprises a graphics processing unit (GPU) 802 and two portions of memory $804_1$ and $804_2$. The two portions of memory $804_1$ and $804_2$ may, or may not, be parts of the same physical memory. The GPU 802 comprises a pre-processing module 806, a tiling unit 808 and rendering logic 810, wherein the rendering logic 810 comprises a fetch unit 812, processing logic 813 which includes one or more processing cores ($814_1$ to $814_6$) and a cache 826, and scheduling logic 816 which comprises one or more rendering queues 818. The rendering logic 810 is configured to use the processing cores 814 of the processing logic 813 to implement hidden surface removal (HSR) and texturing and/or shading on graphics data (e.g. primitive fragments) for tiles of the rendering space. In this example, each processor core $814_{1-6}$ can access cache 826. That is, cache 826 is shared amongst the processor cores 814$_{1-6}$. Cache 826 may operate to store graphics data (e.g. primitive and/or texture data) that can be accessed by one or more of the processor cores 814$_{1-6}$ when those cores are rendering a respectively assigned tile. The graphics content of the cache 826 may be controlled by a cache controller (not shown in FIG. 8 for clarity). The cache controller might for example be configured to write graphics data into the cache from some other portion of memory. The cache controller might also be configured to clear, evict, or flush graphics data being stored in the cache, e.g. to enable further data to be stored.

The tiling unit 808 comprises cost indication logic 820 and similarity indication logic 824. The graphics processing system 800 also comprises a compiler 822 configured to compile programs (e.g. shader programs) to be executed on the GPU 802. The compiler 822 may write compiled shader programs to an intermediate memory, wherein at runtime the GPU 802 retrieves the compiled shader programs from the intermediate memory, but for simplicity, the intermediate memory is not shown in FIG. 8.

In the example shown in FIG. 8 the rendering logic 810 comprises six processing cores 814$_1$ to 814$_6$, but in other examples any suitable number of processing cores may be included in the rendering logic 810, e.g. in a range from 1 to 256, or even higher. The number of processing cores in the rendering logic 810 may be adapted to suit the intended use of the graphics processing system (e.g. a graphics processing system to be used in a small mobile device which has tight constraints on processing resources and silicon size may include a small number of processing cores (e.g. 6 processing cores), whereas a graphics processing system to be used in a large device such as a PC or server which has less tight constraints on processing resources and silicon size may include a larger number of processing cores (e.g. 128 processing cores)). Furthermore, though in the example arrangement shown in FIG. 8, each of processor cores 814$_1$ to 814$_6$ can access the cache 826, it will be appreciated that in other examples the processing logic 813 might include more than one cache, with each of those caches capable of being shared by one or more processor cores. That is, in general, processing logic 813 might include one or more caches, with each of those one or more caches being shared between a respective set of one or more processor cores. In addition to shared cache 826, the processing logic 813 might include additional caches that are each local to a respective processor core; i.e. each processor core might additionally access a respective local cache that is not shared amongst other ones of the processor cores. These local caches are not shown in FIG. 8 for clarity.

Figure 9:
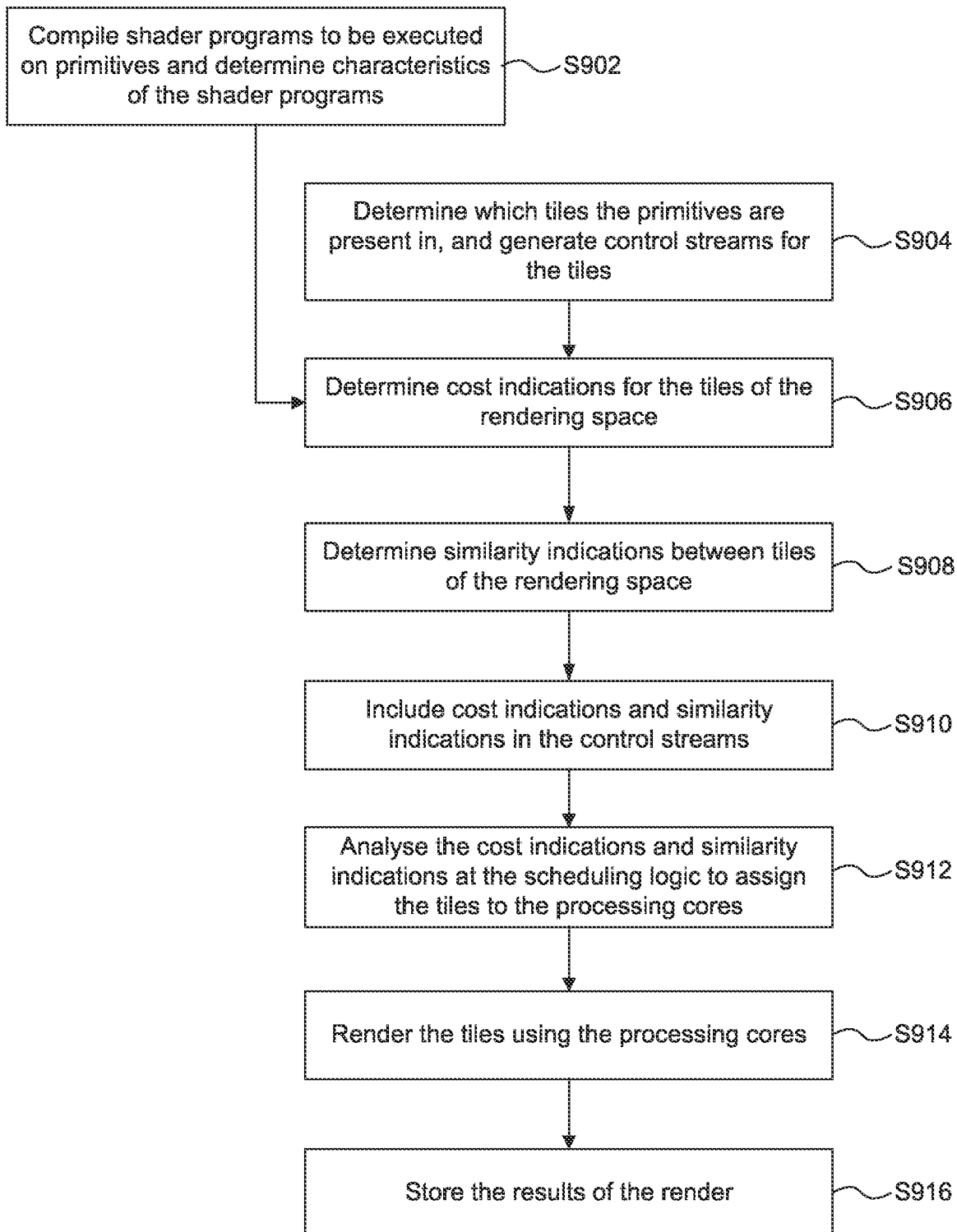
FIG. 9 is a flow chart for a method of processing graphics data using the graphics processing system shown in FIG. 8.

The operation of the graphics processing system 800 is described with reference to the flow chart shown in FIG. 9. Graphics data for performing a render is received at the GPU 802, e.g. from a game application running on a CPU in the same computing system as the GPU 802. The graphics data may include primitive data describing primitives of objects in a scene to be rendered. The graphics data may also specify one or more shader programs which are to be executed on the primitive data for rendering the primitives. It is noted that shaders specifying position (e.g. vertex and geometry shaders) are executed on primitive vertices; whereas shaders specifying how the image will be rendered (e.g. pixel shaders) are executed on primitive fragments corresponding to parts of primitives that cover pixels (or more precisely that cover sample positions).

In step S902 the compiler 822 compiles the shader programs which are associated with the primitives and determines characteristics of the shader programs. The characteristics which are determined include characteristics which are indicative of the complexity of the shader program. In particular, the characteristics are determined so as to give an indication of a cost of processing primitives using the particular shader programs. For example, the length of the shader program (e.g. number of operations to be performed) may be identified. Furthermore, shader programs are identified as being potentially high cost if they contain loops that execute for a variable number of times, where that variable number is determined at runtime, i.e. it is not a known number at compilation time. Loops such as this are potentially very costly to execute if they loop a large number of times in runtime. As another example, the compiler could determine an amount of resources, memory reads or registers used by the shader program, and use this as a measure of the processing cost associated with running the shader program. As an example, a shader which involves lots of sampling from textures which may be sampled from external memory will likely take significantly longer to process than one that primarily consists of arithmetic instructions. Other characteristics which may be determined include whether the shader program includes conditional flow control.

Step S902 may be performed prior to runtime, i.e. in an offline process. For example, the shader programs may be compiled when the application loads. In particular, the shader programs may be compiled before the rendering begins (e.g. before the tiling phase begins) and before the shaders are associated with any specific geometry. However, in other examples it would be possible for a shader program to be compiled during runtime before the main rendering begins, e.g. in response to determining that a primitive is to be processed using the shader program. The compiler 822 can flag a wide number of potentially expensive things that may be present in a shader program. The compiler 822 is arranged to provide the determined characteristics of the shader programs to the tiling unit 808. The compiler 822 is arranged to provide the compiled shader programs to the rendering logic to be executed on one or more of the processing cores 814 for processing primitives.

A sequence of primitives provided by an application may be received at the pre-processing module 806. In a geometry processing phase, the pre-processing module 806 performs functions such as geometry processing including clipping and culling to remove primitives which do not fall into a visible view. The pre-processing module 806 may also project the primitives into screen-space. The primitives which are output from the pre-processing module 806 are passed to the tiling unit 808 for tiling as described below.

In step S904 the tiling unit 808 determines which primitives are present within each of the tiles of the rendering space of the graphics processing system 800. The tiling unit 808 assigns primitives to tiles of the rendering space by creating control streams for the tiles, wherein the control stream for a tile includes indications of primitives which are present within the tile. The control streams and the primitives are outputted from the tiling unit 808 and stored in the memory 804$_1$. The geometry processing phase (performed by the pre-processing module 806 and the tiling unit 808) takes account of primitives across the whole of an image, i.e. for all of the tiles in the image. Then in the rendering phase, the rendering logic 810 renders tiles of the image and stores the outputs for rendered tiles in appropriate portions of a framebuffer, such that when all of the tiles of an image have been rendered, the framebuffer stores the rendered results for the whole image. In examples described herein, the opportunity that is provided in the geometry processing phase to assess all of the data for an image before tiles are rendered for the image is used to determine information about the image which may be useful for the rendering phase, e.g. to improve the efficiency of the rendering phase. In examples described below, tiles can be scheduled for processing by the rendering logic based on: (i) an estimate of the processing cost that will be involved in processing the tiles, and (ii) the similarity between the tiles.

In step S906 the cost indication logic 820 determines cost indications for the tiles of the rendering space. As described above, the cost indication for a tile suggests a cost of processing the tile. The cost indication logic may determine the cost indications based, at least in part, on the determined characteristics of the shader programs that were determined by the compiler 822 in step S902. Furthermore, in general as described below, cost indications may be determined for sets of one or more tiles, i.e. a cost indication may be determined for a tile and/or a cost indication may be determined for a set of tiles. For simplicity some of the explanation herein refers to there being a cost indication for a tile, but in general it is to be understood that this explanation could be extended to having a cost indication for a set of tiles.

The cost indications may be different in different examples. In some examples, the cost indication for a tile may be an estimate of a processing cost that will be incurred when the tile is processed by the rendering logic 810. As described above, a processing cost could be a length of processing time, a number of computation operations performed, a processing power consumed, a number of reads/writes from/to memory, or any other suitable measure of the cost of processing a tile. However, in some examples, the cost indication for a tile might not be a direct estimate of a processing cost. The cost indication for a set of one or more tiles may be based on the content of the set of one or more tiles. The cost indication for a set of one or more tiles may be based on one or more factors which influence a cost of processing the set of one or more tiles. For example, a cost indication could be a number of primitives which are present in a tile. The number of primitives in a tile is not a direct estimate of the cost of processing the tile, but it is indicative of an approximate processing cost that is likely to be involved in processing a tile. For example, a larger number of primitives in a tile may suggest that the tile will incur a greater processing cost. In a broad sense, the cost indication for a tile could be any parameter which is suggestive of a cost of processing the tile, e.g. a parameter which provides some measure of likely processing cost, for use in distinguishing between tiles. It is further noted that the cost indications might not always accurately reflect the true processing costs of processing tiles, but they aim to provide a better indication of processing costs for tiles than if no cost indications were determined at all.

In a simple example, the cost indication for a tile is the number of primitives which are present in the tile. A tile which overlaps with a relatively large number of primitives tends to incur a greater processing cost than a tile with a relatively small number of primitives, so the number of primitives in a tile is a useful cost indication even if it does not always reflect the exact actual processing cost of rendering the tile. Furthermore, the number of primitives in a tile is very simple to calculate in the tiling unit 808 because it can be directly observed from the control stream for the tile, i.e. the number of primitive identifiers included in the control stream for a tile at the end of the tiling phase indicates the number of primitives in that tile. So in this example, the cost indication logic 820 does not add significant complexity to the tiling unit 808.

In a slightly more complex example, the cost indication logic 820 determines the cost indication for a tile by combining (e.g. summing) scores associated with primitives which are present in the tile. The score associated with a primitive may be dependent upon an object type of an object of which the primitive is a part. For example, primitives associated with an opaque object type may be relatively simple to process in the rendering logic 810, so these primitives may be associated with low scores; whereas primitives associated with other object types, e.g. translucent or punch through object types or object types allowing primitives to change their depths during rendering, may be relatively complex to process in the rendering logic 810, so these primitives may be associated with high scores. In particular, the rendering of these more complex object types (e.g. translucency and punch through and types allowing objects to change depth during rendering) may utilise blending or other operations that require multiple passes in the rendering logic 810 to resolve the pixels covered by these primitives. For example, each primitive associated with an opaque object type may be given a score of one, each primitive associated with a translucent or punch through object type may be given a score of ten, and each primitive which may change depth during rendering may be given a score of eight. This reflects a likely difference in the processing costs of the different types of primitives. The score associated with a primitive may depend on the size of the primitive, that is, its coverage area (e.g. the number of pixels covered by the primitive). The score may depend proportionally on the size of the primitive (e.g. number of pixels covered by the primitive). That is, a larger primitive may be associated with a higher score than a smaller primitive. This might be based on the expectation that a larger primitive covering a greater number of pixels is likely to invoke its shader a greater number of times than a smaller primitive invokes its shader. The scores for the primitives within a tile can be summed, or combined in another way, to provide a cost indication for the tile. In different examples, the scores for different object types may be different to those described herein.

In another example, the cost indication logic 820 determines the cost indication for a tile by combining (e.g. by summing) costs associated with each of the primitives which are present in the tile For example, the cost indication for a tile may be the sum of the costs of the shader programs associated with the each of the primitives determined to be present within the tile.

Tessellation is a technique which allows a graphics data item (which may be referred to as a "patch") to be expanded into many primitives during rendering. Tessellation can be useful for representing complex (e.g. curved) surfaces, but can result in a large number of primitives being rendered. A cost indication for a tile could be based on whether tessellation is applied to patches in the tile. As an example, if a tile includes a patch to be tessellated, a cost indication for the tile could depend upon the number of triangles which result from the tessellation of the patch.

In other examples the cost indications may be determined in different ways. For example, the tile coverage area of the primitives in a tile may be considered when determining the cost indication for the tile. The tile coverage area of a primitive indicates a number of sample positions at which that primitive may be visible within the tile, and therefore provides an indication of the amount of processing that will be performed when processing the primitive in the tile in the rendering logic 810. In some examples, a user could provide a user input to guide the determination of the cost indications for the tiles. In this sense the cost indication logic 820 may receive the cost indications for the tiles via an input. For example, a user may be able to specify the cost indications for the tiles directly, e.g. via an API extension, to allow a developer to explicitly provide tile costs to ensure efficient performance using a priori knowledge of the workloads associated with particular tiles.

A driver mechanism may pass information from the compiler 822 to the tiling unit 808, and this information may include the characteristics of the shader programs determined by the compiler 822. Optionally the driver may wish to be used to flag geometry that must be regenerated (e.g. pipeline stages such as geometry shaders and tessellation shaders can be used to expand primitives to create multiple primitives), and in some graphics processing systems the expanded primitives are not stored after the geometry processing phase and must be regenerated before use in the rendering phase. Similarly the driver may also provide information on the frequency at which 3D shading will be performed, e.g. it is possible for the rendering phase to render at a higher pixel rate or a higher sample/fragment rate which is a more costly process. Therefore this information can be useful for the cost indication logic 820 for determining the cost indications.

The examples described above relate to the factors relating to the processing of the current render which can be used to estimate likely processing costs for rendering different tiles of the render. As well as these factors, the cost indication logic 820 could determine the processing costs (either predicted or actual costs) for tiles of a previous render (e.g. the immediately preceding render, e.g. the preceding frame), and can use these as a factor in determining the cost indications for the tiles of the current render. Two frames of a sequence of frames are likely to be similar if they are close to each other in the sequence, e.g. if they are consecutive frames, unless there is a scene change or a sudden change in the content. Therefore, the processing costs of particular tiles in a previous frame provide a good indication of the processing costs of corresponding tiles in a current frame. The "corresponding tiles" in different frames may be tiles in the same position within the rendering space, or may be displaced relative to each other, e.g. by an amount representative of motion of content in the scene (e.g. represented by motion vectors).

To summarise some of the examples described above, the cost indication logic 820 may determine a cost indication for a tile of the rendering space based on one or more of the following factors: (i) a number of primitives in the tile; (ii) object types associated with the primitives in the tile; (iii) tile coverage area of the primitives in the tile; (iv) characteristics of one or more shader programs which are to be executed for rendering the primitives in the tile; (v) a user input; and (vi) a processing cost of a corresponding tile in a previous render. However, it will be apparent that other factors may be used in other examples for determining the cost indications. The cost indication logic 820 may determine the cost indication for a tile based on a plurality of the factors, e.g. according to any suitable combination, which may or may not be weighted in favour of one factor over another factor.

As described above, the characteristics of a shader program may include one or more of: (i) a length of the shader program; (ii) an amount of resources or registers used by the shader program; (iii) whether the shader program includes conditional flow control; (iv) whether the shader program includes loops for which the number of repetitions is undefined at compile time; and (v) a number of memory reads and/or writes used in the shader program.

As described above a cost indication may be determined for each set of one or more tiles. It may be the case that each set of one or more tiles comprises the same number of tiles. In some examples the sets of one or more tiles each comprise a single tile. In other examples, the sets of one or more tiles each comprise a plurality of tiles. The sets of tiles may be blocks of tiles (e.g. contiguous tiles) of the rendering space. The term "block" of tiles is used herein to refer to a plurality of spatially local or adjacent tiles. In particular, the sets of one or more tiles may be arranged to match the assignment of sets of tiles to processing cores 814 in the rendering logic 810. For example, if individual tiles are assigned to particular ones of the processing cores 814 at a time then the sets of tiles may comprise single tiles. However, if blocks of multiple tiles (e.g. 2×2, 4×2 or 4×4 blocks of tiles) are assigned to particular ones of the processing cores 814 at a time then the sets of tiles may comprise corresponding blocks of tiles. As described below, it may be efficient from a cache coherency perspective to assign blocks of tiles to processing cores 814 rather than assigning individual tiles to processing cores 814.

The cost indication logic 820 may quantise the cost indications. In particular, the quantised cost indications may be quantised to be represented by a number of bits. For example, the cost indications may be represented by 1, 4, or 8 bits. or a number of bits in some range, e.g. 1 to 8, or some greater range. In an extreme example, the quantised cost indications each have a single bit, such that they act as a flag to indicate that a tile is either a high cost tile or a low cost tile. Even when the cost indications are quantised to this extent the use of the cost indications can be useful for scheduling the processing of the tiles because it will tend to avoid situations where a high cost tile is scheduled for processing near the end of a render, which as described above can cause a particularly long delay in the render time. Quantising the cost indications reduces the amount of data used to store the cost indications, and as explained below in some examples simplifies the scheduling logic 816 by reducing the number of priority queues implemented therein.

At step S908 the similarity indication logic 824 determines similarity indications between sets of one or more tiles of the rendering space. Each similarity indication may be determined for a pair of sets of one or more tiles. The similarity indication between two sets of one or more tiles indicates, or at least suggests, a level of similarity between the two sets of one or more tiles. The similarity indication between sets of tiles may be a measure of how likely cache hits are when the tiles of that set are processed (e.g. allocated) in sequence. For simplicity, some of the explanation below refers to there being a similarity indication between a pair of tiles, but in general it is to be understood that this explanation could be readily extended to there being a similarity indication between two sets of tiles.

A similarity indication between two sets of one or more tiles may indicate the level of similarity between the two sets of one or more tiles according to at least one processing metric associated with processing the sets of tiles. That is, the two sets of one more tiles may be compared according to the processing metric to determine a level of similarity between the two sets of tiles. In some examples, the processing metric may be used to define data associated with processing a set of one or more tiles. The data for two sets of tiles can then be compared to determine the level of similarity between the two sets of tiles. A similarity indication can then be generated based on that level of similarity.

As will be explained in more detail below, the similarity indication may be a single bit binary value or a multi-bit binary value. In the case of a single bit value, a first value (e.g. a '1') may indicate a relatively high level of similarity between two sets of tiles, and a second value (e.g. a '0') may indicate a relatively low level of similarity between the two sets of tiles.

The similarity indication logic 824 may implement a similarity function to quantify the level of similarity between the two sets of one or more tiles. The similarity function may output a multi-bit value or a single-bit binary value. The similarity function may be a function of the processing metric for the two sets of tiles. The similarity indication may then be generated from the value of the similarity function. In some examples, the similarity indication may be equal to the value of the similarity function. In other examples, the value of the similarity indication may depend on the value of the similarity function. For example, the similarity indication may be a single-bit binary value, and may adopt a first value (e.g. '1') if the value of the similarity function is above a specified threshold, and may adopt a second value (e.g. '0') if the value of the similarity function is below the specified threshold. The use of a similarity function that generates a multi-bit value that can be compared against a threshold to derive a single-bit similarity indication is convenient because it enables more complex assessments of similarity to be made whilst only requiring the storage of a single bit to represent the level of similarity between two sets of tiles.

A processing metric may be a measurement, or parameter, associated with processing the set of one or more tiles. The processing metric may for example be a processing resource used to render the set of one or more tiles. According to this example the similarity indication between two sets of tiles may be generated based on a level of sharing of the processing resource between the two sets of tiles; i.e. on an amount of the processing resources common to both sets of tiles. A higher level of sharing of the processing resource may indicate a higher level of similarity between the two sets of tiles (i.e., a greater amount of the processing resource common to both sets of tiles indicates a higher level of similarity). Consequently, a lower level of sharing of the processing resource may indicate a lower level of similarity between the two sets of tiles (i.e. a lesser amount of the processing resource common to both sets of tiles indicates a lower level of similarity).

The processing resource could for example be the set of shader programs referenced by the set of tiles (i.e., the set of shaders that may be executed in order to render the set of tiles). The similarity indication between two sets of tiles can then be generated based on the number of shader programs referenced by both sets of one or more tiles (i.e., the number of shader programs common to the execution of both sets of tiles). In other words, the similarity indication could be generated from the intersection of the set of shader programs referenced by each set of the two sets of tiles. For a first set of tiles i and a second set of tiles j, this intersection may be expressed mathematically as:

$$\text{intersection} = \text{ShaderSet}(i) \cap \text{ShaderSet}(j) \quad (1)$$

where ShaderSet(i) denotes the set of shaders referenced by the set of tiles i, and ShaderSet(j) denotes the set of shaders referenced by the set of tiles j.

An indication of similarity may then be determined from the size of the intersection set:

$$\text{similarity} = |\text{ShaderSet}(i) \cap \text{ShaderSet}(j)| \quad (2)$$

In equation (2), the '| |' operator denotes the number of items in the set formed from the intersection of the shader sets i and j.

If each set of tiles references a large number of shader programs, it is possible for the number of shader programs common to both sets of tiles to be relatively high even though the tile sets are themselves not that similar. Considering only the number of shader programs common to both sets of tiles may therefore not always provide an accurate indication of similarity between the two sets of tiles.

A more refined similarity indication may be generated by taking into account both the number of shader programs common to both sets of tiles, and the number of distinct shader programs referenced by each set of tiles. In other words, the similarity indication may be generated based on the proportion of the processing resource shared by the two sets of tiles.

For example, for the set of tiles i and j, a similarity function $F_s$ may be generated from the sizes of both the intersection and the union of the set of shader programs referenced by each set of the two sets of tiles. The similarity function may for example be generated as:

$$F_S = \frac{|ShaderSet(i) \cap ShaderSet(j)|}{|ShaderSet(i) \cup ShaderSet(j)|} \quad (3)$$

The similarity indication may then be generated from the similarity function $F_s$.

Another example of a processing metric associated with processing a set of one or more tiles is the graphical data content of that set of one or more tiles; e.g. the graphical data content, such as primitives and/or texture data, that needs to be processed in the rendering phase to render the set of tiles. The similarity indication logic 824 may determine information characterising the graphical data content of a set of one or more tiles. That information may then be compared for two sets of tiles to determine a similarity indication between the two sets of tiles.

The information characterising the graphical data content of a set of tiles may include, for example, one or more of: data indicating which primitives are located within the set of tiles (e.g., a list of primitive IDs for each primitive within the set of tiles); vertex data of the primitives located in the set of tiles; texture data to be applied to primitives located in the set of tiles; and shader resources for shaders invoked to process the set of tiles. Knowledge of which primitives are located within each tile (and the vertex data for those primitives) is conveniently known by the tiling unit 808.

The graphical data content for the two sets of tiles (e.g., the primitive data content for the two sets of tiles) can then be compared to determine the similarity indication. In one example a similarity function $F_s$ may be determined from the ratio of sizes of intersection and union sets, as described above, where the sets are sets of the graphical data content of the tiles, such as the sets of textures referenced by the tiles, or the sets of primitives present within the tiles. That is, the similarity function $F_s$ may be given by:

$$F_S = \frac{|Set(i) \cap Set(j)|}{|Set(i) \cup Set(j)|} \quad (4)$$

where set(i) and set(j) are graphics data sets for tile sets i and j respectively. A graphics data set may be the set of textures referenced by the tile set, or the set of primitives present within the tile set.

In an alternative example, to reduce the processing required to perform this comparison (and the associated storage requirements), the similarity indication logic 824 may implement a hash function to hash the graphical data content for each set of one or more tiles to generate a hash value for that set of tiles. If an appropriate hashing function is used then the hash values for each set of tiles can be compared to determine a level of similarity between the two sets of tiles. A similarity indication may be generated based on the comparison of the hash values. For example, a smaller difference between the hash values may indicate a higher level of similarity between the two sets of one or more tiles. Conversely, a larger difference between the hash values may indicate a lower level of similarity between the two sets of tiles. In some examples, multiple hash values may be generated for each set of tiles. One way to do this would be to generate a hash value for each type of information characterising the graphical data content of the set of tiles (e.g., a hash value generated from the data indicating which primitives are located within the set of tiles; a hash value generated from the vertex data of the primitives located in the set of tiles etc.). The set of hash values generated for each set of the two sets of tiles can then be compared to determine the similarity indication between the two sets of tiles. The use of multiple hash values to determine the similarity indication may provide a more robust, or accurate, assessment of similarity between two sets of tiles.

As another example, the similarity indication logic 824 may determine the similarity indication between two sets of tiles from an indication of the complexity of each set of tiles (e.g., the complexity of the graphical data content to be processed to render that set of tiles). That is, another example of the processing metric is the complexity, or similarly the cost, of processing the set of one or more tiles. This might be useful on the premise that spatially local tile sets are likely to be similar unless there is a discrepancy in cost or complexity between the tile sets that indicates they do not have similar content. In other words, a large discrepancy in cost/complexity between two spatially locally sets of tiles might indicate that the two tile sets are not similar. The benefits of cache coherency are also typically high when sets of tiles are sequentially assigned to the processing cores that are both spatially local to each other and depict relatively simple parts of the scene (i.e. there is a relatively low cost associated with processing the set of tiles). This might be because, for tiles depicting simple parts of the scene, it may be possible to fit a greater proportion of the data related to a tile within the cache, meaning more data is available in the cache for the subsequent tile. It has therefore been appreciated that a measure of the cost of processing the sets of one or more tiles can be used to determine the similarity indication between two sets of tiles.

The similarity indication logic 824 may conveniently determine the similarity indication between two sets of tiles from the cost indications associated with those sets of tiles. In one example, the similarity indication logic 824 evaluates a similarity function to output a value indicating the level of similarity between the two sets of tiles depending on the cost indications for each of the two sets of tiles, and the difference in the cost indications between the two sets of tiles. The similarity function can be used by the similarity indication logic 824 to identify whether two sets of tiles each have a processing cost below a specified threshold and a certain level of similarity (i.e. a level of similarity above a specified threshold).

The similarity function may output a binary value. It may output a first value (e.g. '1') indicating a relatively high level of similarity between two sets of tiles i and j when the following conditions are satisfied: 1) the cost indication for the set of tiles i indicates the cost of processing that set of tiles is less than a specified threshold (e.g., the cost indication for the set of tiles i is less than a specified threshold); 2) the cost indication for the set of tiles j indicates the cost of processing that set of tiles is less than a specified threshold (e.g., the cost indication for the set of tiles j is less than a specified threshold); and 3) the difference between the cost indications for the set of tiles i and j is less than a specified threshold. If any of conditions 1) to 3) are not satisfied, the similarity function may output a second value (e.g. '0') indicating a relatively low level of similarity between the two sets of tiles. The similarity indication may then be taken as the output of the similarity function.

In other examples, the similarity function may output a multi-bit value. This multi-bit value may then be taken as the similarity indication (e.g. if the similarity indication is a multi-bit value) or compared against a threshold to generate a single-bit binary similarity indication.

Though similarity indications indicate the level of similarity between two sets of tiles, each similarity indication may be assigned by the similarity indication logic 824 to a set of one or more tiles. In this case, a similarity indication assigned to a set of one or more tiles indicates the level of similarity between that set of one or more tiles and another set of one or more tiles.

The similarity indication logic may assign a group of similarity indications to a set of tiles. Each similarity indication within the group assigned to a set of tiles indicates the level of similarity between that set of tiles and a respective other set of tiles. Each similarity indication within the group of indications assigned to a set of tiles may indicate the level of similarity between that set of tiles and other sets of tiles having a specified spatial relationship in the rendering space to that set of tiles. An example of this is illustrated in FIG. 10.

Figure 10:
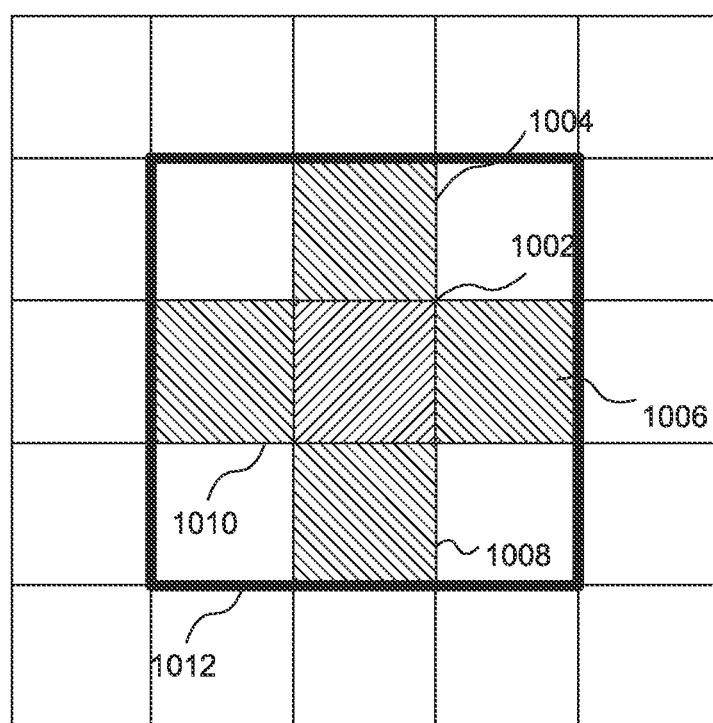
FIG. 10 shows an example of how multiple similarity indications can be assigned to a set of one or more tiles.

FIG. 10 shows a 5×5 arrangement of tile blocks. Each tile block is a set of tiles. In the examples in which a set of tiles includes only a single tile, it follows that a tile block refers to a single tile also. A group of similarity indications are assigned to the set of tiles 1002 located at the centre of the cross pattern. In this particular example, four similarity indications are assigned to the set of tiles 1002. Each similarity indication indicates the level of similarity between the set of tiles 1002 and a respective other set of tiles spatially adjacent to the set of tiles 1002. These spatially adjacent sets of tiles are denoted 1004, 1006, 1008 and 1010. Groups of similarity indications can be assigned to other sets of tiles in the rendering space in a similar way.

Alternatively, each similarity indication within a group of similarity indications assigned to a set of tiles may indicate the level of similarity between that set of tiles and other sets of tiles within a localised region of that set of tiles. An example of a localised region for the set of tiles 1002 is shown at 1012. The localised region 1012 is centred on the set of tiles 1002. The localised region 1012 has a size of 3×3 tile blocks. In other examples, the size of the localised region may be smaller or larger than the region 1012. The localised region may alternatively be referred to as a window of the rendering space. The group of similarity indications assigned to the set of tiles 1002 may indicate the level of similarity between that set of tiles 1002 and at least some of the other sets of tiles within the localised region 1012. The group of similarity indications may indicate the level of similarity between the set of tiles 1002 and each other set of tiles located within the localised region 1012. In the example shown in FIG. 10, this would mean assigning a group of eight similarity indications to the set of tiles 1002.

In other examples, the similarity indication logic 824 may assign only a single similarity indication to each set of tiles. The similarity indication assigned to each set of tiles may indicate the level of similarity between that set of tiles and another set of tiles having a specified spatial relationship within the rendering space to that set of tiles. That spatial relationship may be set by a spatial ordering of the set of tiles within the rendering space (e.g. a Peano curve, a Morton/Z-order or an N-order). That is, the similarity indication assigned to a set of tiles may indicate the level of similarity between that set of tiles and a second set of tiles that is specified according to some spatial order of the sets of tiles within the rendering space. An example of this is illustrated in FIG. 11.

Figure 11:
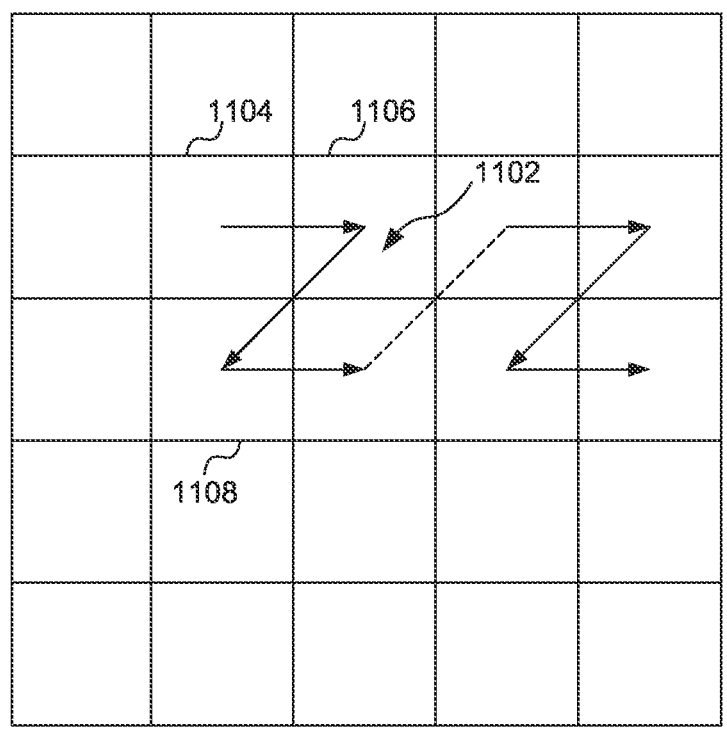
FIG. 11 shows an example of how a single similarity indication can be assigned to a set of one or more tiles.

FIG. 11 shows a 5×5 arrangement of tile blocks. Each tile block is a set of tiles. In the examples in which a set of tiles includes only a single tile, it follows that a tile block refers to a single tile also. Part of a spatial ordering pattern of the sets of tiles within the rendering space is shown generally at 1102. In this example, the spatial ordering pattern is a Z-order.

A similarity indication assigned to a set of tiles indicates the level of similarity between that set of tiles and the next set of tiles within the rendering space specified according to the Z-order. For example, the similarity indication assigned to the set of tiles 1104 indicates the level of similarity between that set of tiles 1104 and the set of tiles 1106 (the set of tiles 1106 being the next set of tiles following the set of tiles 1104 according to the Z-order). Analogously, the similarity indication assigned to the set of tiles 1106 indicates the level of similarity between that set of tiles 1106 and the next set of tiles 1108 specified by the Z-order.

In summary, the similarity indication logic 824 determines similarity indications between sets of one or more tiles of the rendering space. It may be the case that each set of one or more tiles comprises the same number of tiles. In some examples the sets of one or more tiles each comprise only a single tile. In other examples, the sets of one or more tiles each comprise a plurality of tiles. The sets of tiles may be blocks of tiles (e.g. contiguous tiles) of the rendering space. The term "block" of tiles is used herein to refer to a plurality of spatially local or adjacent tiles. In particular, the sets of one or more tiles may be arranged to match the assignment of sets of tiles to processing cores 814 in the rendering logic 810 (and to match the sets of tiles for which cost indications are determined at step 906). For example, if individual tiles are assigned to particular ones of the processing cores 814 at a time then the sets of tiles may comprise only single tiles. However, if blocks of multiple tiles (e.g. 2×2, 4×2 or 4×4 blocks of tiles) are assigned to particular ones of the processing cores 814 at a time then the sets of tiles may comprise corresponding blocks of tiles. It may be efficient from a cache coherency perspective to assign blocks of tiles to respective processing cores 814 (i.e., to assign blocks of tiles to particular ones of the processing cores at a time) rather than assigning individual tiles to processing cores 814.

In step S910 the tiling unit 808 includes the determined cost indications and similarity indications in the control streams for the tiles to be stored in the memory 804$_1$. For example, the tiling unit 808 may accumulate the cost of primitives determined to be within a tile in a tail pointer cache which includes pointers to the ends of the lists of primitive IDs for respective tiles. At the end of the geometry phase processing for a render (i.e. after tiling), similarity indications may be determined, e.g. from the graphical data content of the tile, or from the determined cost indications. When the cost indication logic 820 has determined the cost indications for the tiles and the similarity indication logic has determined the similarity indications, the cost and similarity indications may be stored in a suitable place in the control streams such as the region header. These operations may be performed without having to significantly alter the operation of the tiling unit 808. At the end of the geometry processing phase the control streams for the tiles (including the cost and similarity indications) are stored in the memory 804$_1$.

In the rendering phase the scheduling logic 816 receives the control streams for the tiles of the rendering space for a current render. The scheduling logic 816 is shown as being part of the rendering logic 810, but in other examples the scheduling logic 816 may be thought of as a tile sequencer which acts outside of the rendering logic 810 and which determines the order of the tiles to be processed by the rendering logic 810. In some examples, the scheduling logic could be implemented as part of the fetch unit 812.

At step S912, the scheduling logic 816 analyses the cost indications and similarity indications to assign tiles to the processing cores 814. The scheduling logic may perform a pre-pass of the control streams to analyse the cost and similarity indications for the sets of tiles. In this way, the scheduling logic 816 assigns sets of tiles to the processing cores 814 for rendering in dependence on the cost indications and the similarity indications.

For the purposes of clarity, in the following the notation $T_i$ refers to the set of tiles most recently assigned to the processing cores, and $T_{i+1}$ refers to the set of tiles that are next assigned to the processing cores, i.e. the sets of tiles $T_i$ and $T_{i+1}$ are assigned to the processing cores sequentially. Typically (though not necessarily), tiles $T_i$ and $T_{i+1}$ will be assigned to different processing cores.

The scheduling logic 816 may, each time a set of tiles $T_i$ is assigned to the processing cores, select the next set of tiles $T_{i+1}$ to be assigned using either the cost indications or the similarity indications. In some examples, whether the cost or similarity indications are used to select the next set of tiles to assign to the processing cores depends on the similarity indication(s) assigned to the set of tiles $T_i$ that has been most recently assigned to the processing cores. If those similarity indications indicate there is a set of tiles yet to be assigned to the processing cores that has a level of similarity with the most recently assigned set of tiles that is above a specified threshold, then the similarity indications are used to select the next set of tiles $T_{i+1}$ to assign to the processing cores. Conversely, if the scheduling logic 816 determines that the similarity indications assigned to the set of tiles $T_i$ most recently assigned to the processing cores indicate there is no set of tiles that has yet to be assigned to the processing cores that has a level of similarity with that most recently assigned set of tiles that is above the specified threshold, then the scheduling logic assigns the next set of tiles $T_{i+1}$ to the processing cores according to the cost indications.

Thus, in general, scheduling logic 816 may be configured to assign a next set of one or more tiles $T_{i+1}$ to the processing cores according to the cost indications only if the similarity indications indicate that there is no level of similarity above a specified threshold between the set of one or more tiles $T_i$ most recently assigned to the processing cores and other sets of one or more tiles yet to be assigned to the processing cores.

If the similarity indications indicate that there is a level of similarity above a specified threshold between the set of one or more tiles $T_i$ most recently assigned to the processing cores and other sets of one or more tiles yet to be assigned to the processing cores, the scheduling logic 816 uses the similarity indications to assign the next set of tiles $T_{i+1}$ to the processing cores. The scheduling logic 816 may use the similarity indications to assign the next set of tiles in a number of ways.

In other words, a next set of one or more tiles is assigned to a processing core based on the similarity indications unless there are no sets of one or more tiles which are yet to be assigned to the processing cores and which have similarity indications indicating a level of similarity above a threshold, in which case a next set of one or more tiles is assigned to a processing core based on the cost indications.

For example, if only a single similarity indication is assigned to each set of tiles that indicates the level of similarity between that set of tiles and another second set of tiles having a specified spatial relationship to that set of tiles, the scheduling logic 816 next assigns that second set of tiles to the processing cores (provided the similarity indication indicates the level of similarity is above the specified threshold). Thus, if the similarity indication assigned to each set of tiles indicates the level of similarity between that set of tiles and another set of tiles specified according to a spatial order of the tiles in the rendering space is above the specified threshold, the scheduling logic can assign the next set of tiles $T_{i+1}$ to the processing cores according to a scheduling order that follows that spatial order. Referring back to FIG. 11 as an example, assume the set of tiles 1104 is the most recently assigned tile $T_i$ to the processing cores. If the similarity indication assigned to the set of tiles 1104 indicates the level of similarity between that set 1104 and the next set of tiles 1106 following the spatial order 1102 is above the specified threshold, the scheduling logic 816 next assigns the set of tiles 1106 to the processing cores (i.e. the set of tiles 1106 is $T_{i+1}$).

Alternatively, if each set of tiles is assigned a group of similarity indications, and the group of similarity indications for the set of tiles $T_i$ most recently assigned to the processing cores indicates there are one or more other sets of tiles yet to be assigned to the processing cores that have a level of similarity with the most recently assigned set of tiles $T_i$ that is above a specified threshold, the scheduling logic 816 next assigns one of those other sets of tiles to the processing cores. The scheduling logic 816 may select as the next set of tiles $T_{i+1}$ to be assigned to the processing cores the set that has yet to be assigned that has the highest level of similarity with the most recently assigned set of tiles $T_i$ (as indicated by the similarity indication values in the group). Referring back to FIG. 10 as an example, assume the set of tiles 1002 is the set of tiles $T_i$ most recently assigned to the processing cores. If the group of similarity indications assigned to tile 1002 indicate there are one or more other sets of tiles yet to be assigned that have a level of similarity with the set of tiles 1002 above the specified threshold (e.g. out of the sets of tiles 1004, 1006, 1008, 1010; or a set of tiles within the localised region 1012), the scheduling logic 816 selects one of those sets of tiles as the next set of tiles assigned to the processing cores.

As described above, the similarity indications may be binary values (i.e. a single bit) or multi-bit values. If the similarity indications are single-bit binary values, the scheduling logic 816 may determine that a first value of the similarity indication (e.g. '1') indicates the level of similarity between two sets of tiles is greater than the specified threshold, and a second value of the similarity indication (e.g. '0') indicates that the level of similarity between the two sets of tiles is less than the specified threshold.

If the similarity indications are multi-bit values, the scheduling logic may determine that a similarity indication indicates that two sets of tiles have a level of similarity above the specified threshold when the value of the similarity indication is equal to or exceeds a threshold value, and that a similarity indication indicates two sets of tiles have a level of similarity below the specified threshold when the value of the similarity indication is below the threshold value. The scheduling logic 816 may vary the value of the similarity indication threshold in dependence on the cost indications for the sets of tiles of the current render, or on the cost indications for the sets of tiles of one or more previous renders. The scheduling logic may for example set the value of the similarity indication threshold based on an average value of the cost indications for the render (i.e. the average value of the cost indications for the sets of tiles of the current render). In other examples, the scheduling logic may vary the similarity indication threshold during the render. This may be done to prioritise processing more complex tiles or tiles more likely to benefit from cache reutilization at different stages of the render. For example, it may be desirable to prioritise processing more complex tiles at the beginning of the render, and so the scheduling logic may set the value of the similarity indication threshold relatively high (making it more likely tiles will be assigned based on their cost indications). During the render, the scheduling logic may decrease the value of the similarity indication threshold (making it more likely tiles will be assigned to processing cores based on their similarity indications). Of course, other implementations are possible.

It was stated above that the scheduling logic 816 assigns a next set of one or more tiles $T_{i+1}$ to the processing cores according to the cost indications if the similarity indications indicate that there is no level of similarity above a specified threshold between the set of one or more tiles $T_i$ most recently assigned to the processing cores and other sets of one or more tiles yet to be assigned to the processing cores.

Examples of how the scheduling logic assigns sets of tiles to the processing cores based on the cost indications will now be described.

The scheduling logic 816 may assign sets of one or more tiles for the render to the processing cores 814 according to a scheduling order set by the cost indications. This scheduling order may be in order of decreasing cost indications (i.e. sets of tiles with higher cost indications are higher in the scheduling order—that is, prioritised over—sets of tiles with lower cost indications). In another example, the scheduling logic 816 may assign a plurality of sets of one or more tiles with the highest cost indications to different processing cores 814, to thereby distribute the sets of tiles with the highest cost indications amongst the processing cores 814.

The scheduling logic 816 may maintain a rendering queue 818 for each of the processing cores 814 to indicate which tiles are to be processed by the respective processing cores 814, and the order in which they are to be processed.

The scheduling logic 816 may form a priority queue (different to the rendering queues 818) for sets of tiles for each of the different cost indication values. This works particularly well when the cost indications have been quantised such that there are a small number of distinct cost indication values. The sets of one or more tiles are assigned to the processing cores for rendering in an order according to the contents of the priority queues. For example, if the cost indications are quantised down to 2-bit values, there are four different quantised cost indication values (0, 1, 2 and 3) and hence the scheduling logic 816 maintains four priority queues. Indications of sets of tiles which have a quantised cost indication value of zero are stored in priority queue 0; indications of sets of tiles which have a quantised cost indication value of one are stored in priority queue 1; indications of sets of tiles which have a quantised cost indication value of two are stored in priority queue 2; and indications of sets of tiles which have a quantised cost indication value of three are stored in priority queue 3. When the scheduling logic 816 comes to schedule a set of tiles for processing using the cost indications (e.g. by adding a set to the rendering queue 818 associated with one of the processing cores 814) the scheduling logic 816 will select a set which is identified in priority queue 3 unless priority queue 3 is empty, in which case the scheduling logic 816 will select a set which is identified in priority queue 2 unless priority queue 2 is empty, in which case the scheduling logic 816 will select a set which is identified in priority queue 1 unless priority queue 1 is empty, in which case the scheduling logic 816 will select a set which is identified in priority queue 0 unless priority queue 0 is empty, in which case there are no more sets to schedule.

In step S914 the rendering logic 810 renders the tiles using the processing cores 814 according to the determined scheduling. Steps S912 and S914 may be performed concurrently such that sets of tiles are assigned to processing cores as the processing cores render other, previously assigned, sets of tiles. As described above, in this example, the processing of a particular tile is performed by a single one of the processing cores 814, i.e. the processing of a tile is not divided between multiple processing cores 814. This helps to improve the cache coherency and efficiency of processing by reducing a need to communicate data between the processing cores 814. Step S914 involves the fetch unit 812 fetching the primitive data for rendering a tile and providing the data to the appropriate one of the processing cores 814 (based on the scheduling determined by the scheduling logic 816). The processing logic 813 uses the processing cores 814 to execute operations on the primitive data for a tile in order to render the tile. The processing logic 813 includes other components (not shown in FIG. 8) such as registers, caches, control logic, etc. for performing the processing of the primitive data using the processing cores 814.

The processing logic 813 may perform deferred rendering such that hidden surface removal is performed on primitives to remove primitive fragments which are hidden from view by other primitives in the scene, and then texturing and/or shading is applied to the primitive fragments after the hidden surface removal has been applied to those primitive fragments. Texturing typically involves reading texture data from a memory and applying the texture to primitive fragments in order to determine colour values of rendered primitive fragments. Shading typically involves executing shader programs on primitive fragments to add visual effects to the rendering of the primitive fragment. These shader programs are the shader programs mentioned above that were compiled by the compiler 822 and provided to the rendering logic 810. Methods of performing hidden surface removal, texturing and shading are known in the art and as such the details of these methods are not described in detail herein.

In other examples, the processing logic 813 may perform non-deferred rendering such that texturing and/or shading is applied to primitive fragments, and then hidden surface removal is performed on the textured/shaded primitive fragments to remove primitive fragments which are hidden from view by other primitives in the scene. Non-deferred rendering methods may be less efficient than deferred rendering methods because they involve unnecessarily shading and texturing of primitive fragments which are ultimately hidden in the scene.

Both the deferred rendering and non-deferred rendering systems described above implement rasterisation techniques to render primitive data. In other examples, other rendering techniques may be used in the rendering logic, for example a ray tracing technique may be used to render the primitive data. Ray tracing techniques are known in the art and as such the details of implementing a ray tracing rendering technique are not described in detail herein.

In step S916 the results of the render are stored. For example, if the result of the render is a frame then the rendered frame may be stored in the memory $804_2$. A rendered frame may be used in any suitable manner. For example, a rendered frame may be displayed on a display. A rendered frame may be transmitted to another device, e.g. over a network such as the Internet and/or a mobile telephone network. If the render is a sub-render then the result of the render may be for use in a subsequent render, e.g. the result of the sub-render could be a texture, shadow map or environment to be applied in a subsequent render. In this case, the result of the render could be stored (e.g. in memory $804_2$) and subsequently provided back to the rendering logic 810 for use in the subsequent render. Alternatively, the result of the render could be stored on the GPU 802 itself.

Figure 12:
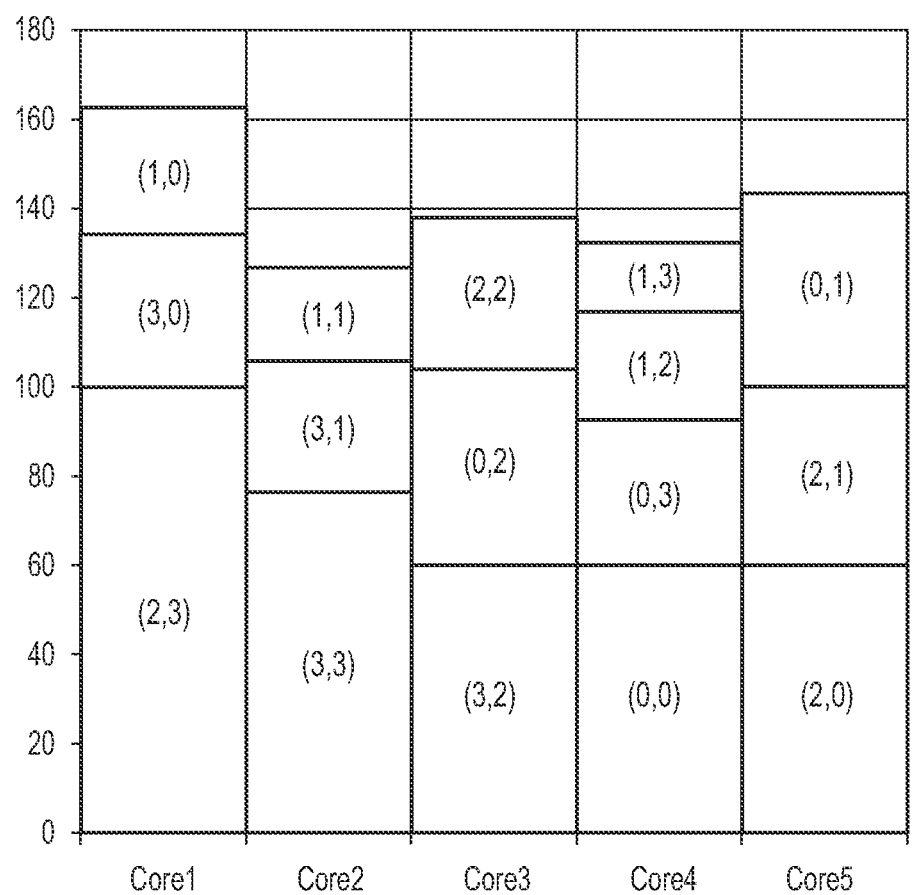
FIG. 12 is a graph the timing of execution of the set of 4×4 tiles on a 5-core GPU when a scheduling method based on cost indications and similarity indications is used to assign the tiles to the GPU cores and an estimate of processing savings due to cache coherency is taken into account.

An illustration of the advantages of scheduling tiles to processing cores based on both cost indications and similarity indications will now be provided with reference to FIG. 12. FIG. 12 shows the timing of execution of the 4×4 block of tiles having individual processing times shown in FIG. 3 on a 5-core GPU when the tiles are assigned to the cores in dependence on both similarity indications and cost indications. Each tile in FIG. 12 is identified by its position within the block (e.g., the rectangle (0,3) denotes the time taken to process tile (0,3) within the block). The timings shown in FIG. 12 are the result of a simulation performed by the inventors. Tiles that benefit from cache coherency are assumed to have a processing time decreased by 15% from the respective value shown in FIG. 3. Tiles are assumed to benefit from cache coherency within the cache shared by the processing cores that render those tiles (e.g. cache 826) when they are scheduled sequentially after another tile within the same 2×2 quad of tiles in the rendering space. The similarity indications for the tiles were calculated from a similarity function $F_s$. The similarity function for a tile ($F_s$) indicates the level of similarity between that tile ($t_i$) and another tile ($t_{i+1}$) specified according to an N-order within the rendering space. Mathematically, in an example, the similarity function for a tile t is calculated as:

$$F_s(t_i, t_{i+1}) = (\text{complexity}(t_i) < \text{complexitythreshold})\hat{\ } \\ (\text{complexity}(t_{i+1}) < \text{complexitythreshold})\hat{\ }((|\text{complexity}(t_i) - \text{complexity}(t_{i+1})| \leq \text{maxcomplexityDelta}) \quad (4)$$

where complexity($t_i$) is the cost indication for tile $t_i$, complexity($t_{i+1}$) is the cost indication for tile $t_{i+1}$, complexitythreshold is a cost indication threshold, maxcomplexityDelta is a cost-indication difference threshold, and $\hat{\ }$ is a logical AND operator. Tile $t_{i+1}$ is the next tile after $t_i$ following the N-order. The function $F_s$ outputs a value of '1' for tile $t_i$ if all the conditions in equation (4) are satisfied, and outputs a value of '0' for tile $t_i$ if at least one of the conditions are not satisfied. The output value of the function is taken as the similarity indication for the tile $t_i$.

The cost indications for each tile are taken as the time to process that tile as given by the corresponding values in FIG. 3. Thus, the largest cost indication is equal to the longest time to process one of the tiles (which in this example is the value 99). In the simulation, the numerical value of complexitythreshold was set at 50, and the numerical value of maxcomplexityDelta was set at 10.

If the function $F_s$ returned a value of '1' for tile $t_i$, then the next tile $t_{i+1}$ assigned to the processing cores is the next tile specified by the N-order within the rendering space. If the function $F_s$ returned a value of '0' for the tile $t_i$, the next tile $t_{i+1}$ assigned to the processing cores is the tile having the highest cost indication of the remaining unassigned tiles.

The simulation results show that the time taken to process the 4×4 block of tiles was 163 T. According to the simulation results, the approach of scheduling tiles according to both cost indications and similarity indications therefore outperforms the approach of scheduling tiles only according to spatial order within the rendering space (as shown in FIG. 6, which took 175 T to process the tiles) and the approach of scheduling tiles only according to cost indications (as shown in FIG. 7, which took 177 T to process the tiles).

The above examples demonstrate how scheduling logic that assigns sets of tiles to processing cores based on cost indications and similarity indications can improve the performance of a GPU when rendering a scene by having the flexibility to suitably schedule complex tiles for processing whilst maintaining the ability to schedule spatially local tiles when appropriate to take advantage of cache coherency.

In the above examples, the similarity indications were calculated by the similarity indication logic 824 that formed part of the tiling unit 808. That is, the similarity indications were calculated during the geometry processing phase of the pipeline, prior to the control streams being written to memory 804$_1$ (and hence prior to the rendering phase of the pipeline). In other examples, the similarity indications may be calculated during the rendering phase of the pipeline. That is, the control streams written to the memory may still contain the cost indications, but not the similarity indications.

Figure 13:
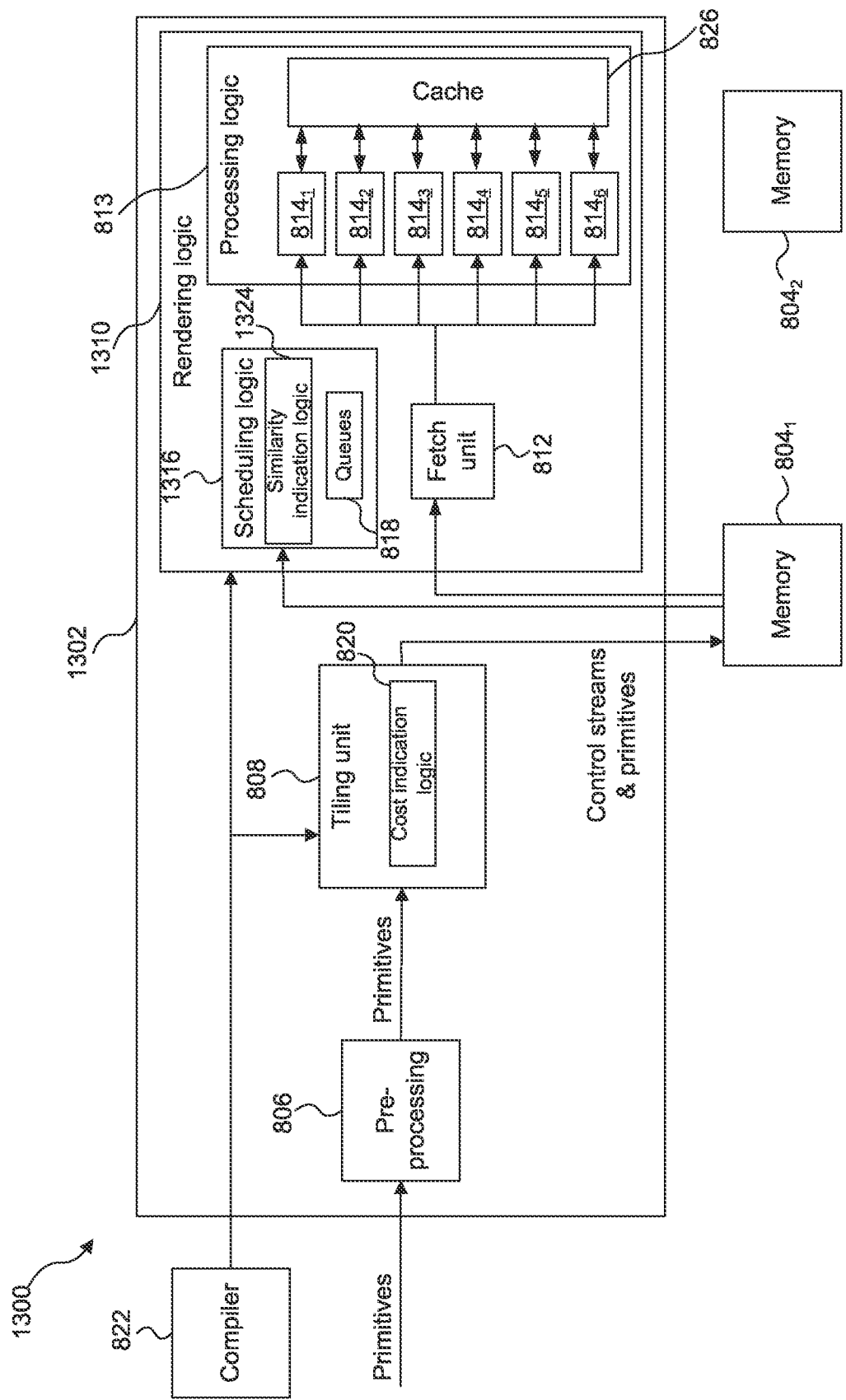
FIG. 13 is another example of a graphics processing system.

FIG. 13 shows an example of a graphics processing system 1300 for rendering an image of a 3D scene. Like components with the graphics processing system 800 of FIG. 8 are denoted by like reference numerals. The graphics processing system 1300 comprises a graphics processing unit (GPU) 1302 and two portions of memory 804$_1$ and 804$_2$. The GPU 1302 comprises a pre-processing module 806, a tiling unit 808 and rendering logic 1310, wherein the rendering logic 1310 comprises a fetch unit 812, processing logic 813 which includes one or more processing cores (814$_1$ to 814$_6$) and cache 826, and scheduling logic 1316 which comprises one or more rendering queues 818. The scheduling logic further includes similarity indication logic 1324.

Figure 14:
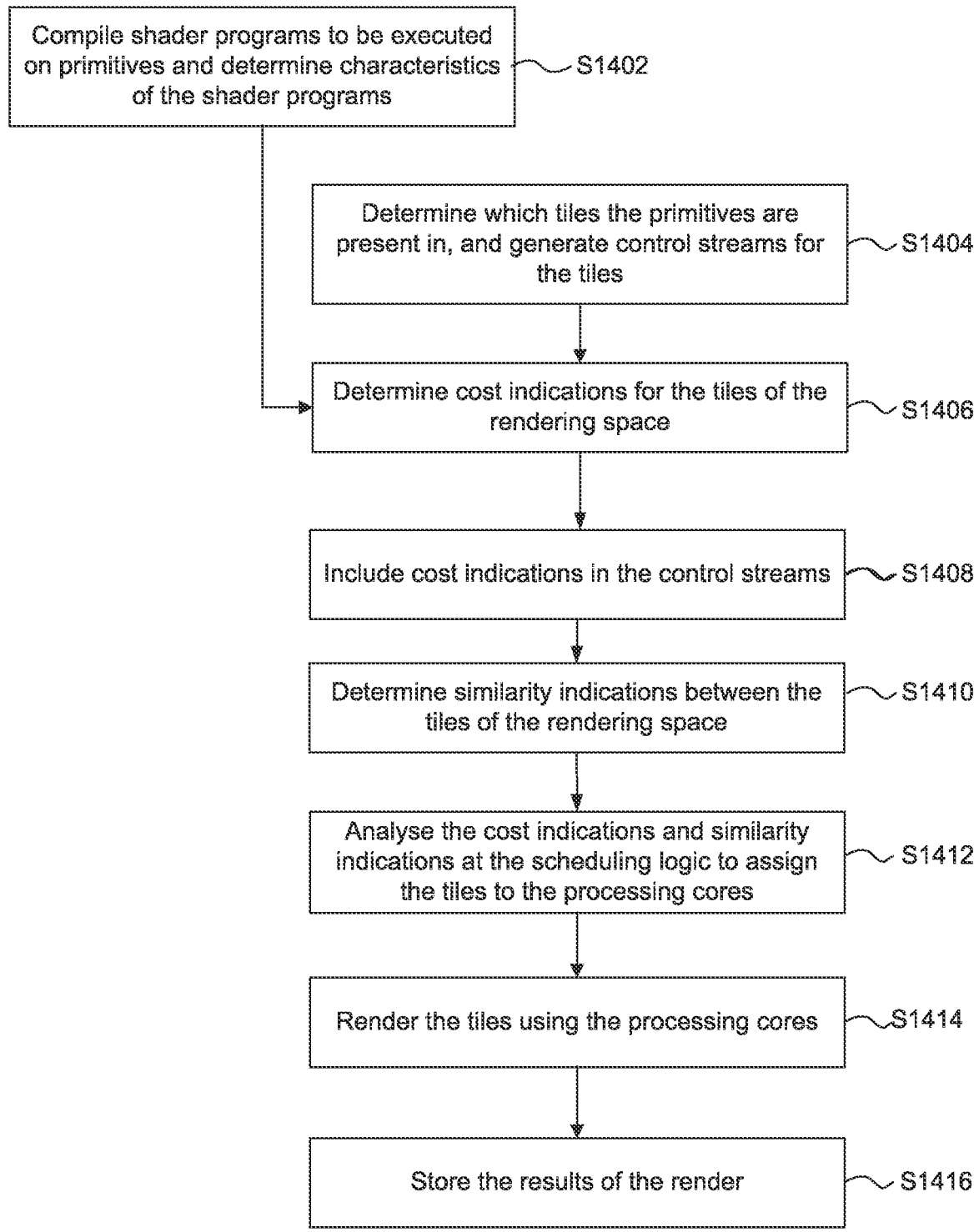
FIG. 14 is a flowchart for a method of processing graphics data using the graphics processing system shown in FIG. 13.

The operation of the graphics processing system 1300 is described with reference to the flow chart shown in FIG. 14.

Steps S1402 and S1404 are analogous to steps S902 and S904 described above with reference to FIG. 9, and so a description of these steps will not be repeated here.

At step S1406, the cost indication logic 820 determines cost indicates for the sets of one or more tiles. The cost indication logic 820 operates to do this in the same manner as described above with reference to FIG. 8. At step S1408 the tiling unit includes the cost indications in the control streams written to memory. This step (insofar as it relates to cost indications) is analogous to step S910 described above.

In the rendering phase the scheduling logic 1316 receives the control streams for the tiles of the rendering space for a current render. The scheduling logic 1316 is shown as being part of the rendering logic 1310, but in other examples the scheduling logic 1316 may be thought of as a tile sequencer which acts outside of the rendering logic 1310 and which determines the order of the tiles to be processed by the rendering logic 1310. In some examples, the scheduling logic could be implemented as part of the fetch unit 812.

At step S1410 the similarity indication logic 1324 determines similarity indications between sets of tiles of the rendering space. The similarity indication logic 1324 may compute the similarity indications using information included within the control streams that are generated by the tiling unit 808. For example, the similarity indication logic may read information from the control stream header, and use that information to calculate the similarity indications. The similarity indication logic may determine the similarity indications using any of the approaches described above with reference to S908 of FIG. 9.

The similarity indication logic 1324 may assign a group of one or more similarity indications to each set of one or more tiles, as described above with reference to step S908 in FIG. 9. A potential advantage of including the similarity indication logic within the scheduling logic 1316 is that the similarity indications may be computed 'on the fly' during the rendering performed by the rendering logic 1310. For example, similarity indication logic 1324 may compute the similarity indication(s) for a set of tiles after that set of tiles has been assigned to the processing cores, but before the next set of tiles is assigned to the cores. In other words, the similarity indications may be computed in real-time as they are needed to determine the next set of tiles to assign to the processing cores.

At step S1412, the scheduling logic 1316 analyses the cost indications and similarity indications to assign tiles to the processing cores. Steps S1410 and S1412 may be performed concurrently such that similarity indications for a set of tiles that have been assigned to the processing cores are determined as part of the analysis to assign the next tile to the cores. The scheduling logic may analyse the cost and similarity indications to assign the next set of tiles in accordance with any of the examples described above with reference to S912.

Thus, each time a set of tiles $T_i$ is assigned to a core, the scheduling logic 1316 may operate to: i) calculate the group of one or more similarity indications assigned to that set of tiles $T_i$; and ii) assign the next set of tiles $T_{i+1}$ to the processing cores in dependence on the similarity indications and cost indication for tile T. The one or more similarity indications may be calculated as per any of the examples described above with reference to step S908. The next set of tiles to assign to the processing cores may be chosen in accordance with any of the approaches described above with reference to step S912.

A potential advantage of computing the similarity indications within the scheduling logic 1316 (i.e. during the rendering phase as opposed to the geometry phase) is that there may be a greater flexibility in deciding when, and how many, similarity indications are calculated. For example, the similarity indication logic 1324 might compute similarity indications between sets of tiles whilst concurrently allocating sets of tiles to the processing cores according to the cost indications. That is, the similarity indication logic might compute one or more similarity indications at a time when sets of tiles are allocated to the processing cores according to the cost indications. The scheduling logic may determine when to calculate the one or more similarity indications. The computed similarity indications may be used to generate a scheduling order for a plurality of sets of tiles that is set in accordance with those similarity indications. Each set of tiles in the generated scheduling order might have a similarity indication indicating a level of similarity with another set of tiles in that scheduling order that is above a specified threshold. That is, the scheduling order may be a scheduling order for similar sets of tiles. In other words, the similarity indication logic may perform the following steps:
  (i) calculate one or more similarity indications between sets of tiles;
  (ii) determine from the similarity indications each set of tiles having a level of similarity without another set of tiles that exceeds a specified threshold;
  (iii) generate a scheduling order for the determined sets of tiles.

The scheduling logic 1316 may then determine whether to allocate sets of tiles to the processing cores according to the cost indications or according to the generated scheduling order. For example, the scheduling logic may switch to allocate sets of tiles according to the generated scheduling order when the number of sets of tiles in the scheduling order exceeds a specified threshold. This may conveniently enable tiles within regions of the scene of relatively high similarity to be allocated to the processing cores sequentially to utilise the benefits of cache coherency described above.

By computing the similarity indications within the rendering phase, the similarity indication logic can compute similarity indications for a group of sets of tiles in isolation of other sets of tiles. This enables the possibility of calculating fewer similarity indications and/or controlling when to calculate the similarity indications. For example, some scenes may have few similar sets of tiles, in which case it may be desirable to avoid calculating too many similarity indications and to prioritise allocating tiles according to cost indications. In contrast, other scenes may have a greater number of similar sets of tiles, in which case it may be desirable to prioritise allocating tiles according to the similarity indications. Thus, it can be appreciated that in some circumstances it might be desirable to have the flexibility to control when and how many similarity indications to compute, rather than having to compute a fixed set of similarity indications for each scene.

At step S1414 the tiles are rendered using the processing cores. Steps S1412 and S1414 may be performed concurrently such that sets of tiles are assigned to processing cores as the processing cores render other, previously assigned, sets of tiles. The tiles may be rendered in an analogous manner to that described above with reference to S914.

At step S1416, the results of the render are stored. This step is analogous to S916 described above.

Figure 15:
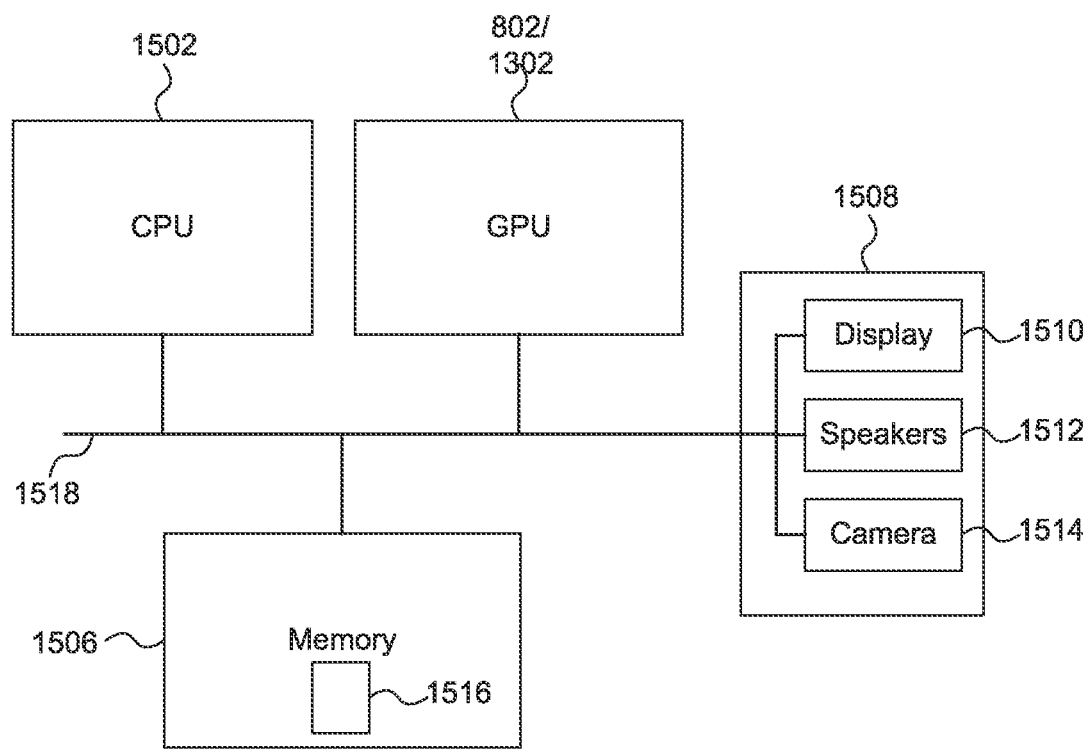
FIG. 15 shows an example computer system.

FIG. 15 shows a computer system in which the graphics processing systems described herein may be implemented. The computer system comprises a CPU 1502, a GPU 802 or 1302, a memory 1506 and other devices 1108, such as a display 1510, speakers 1512 and a camera 1514. The components of the computer system can communicate with each other via a communications bus 1518. A store 1516 (corresponding to memories 804$_1$ and 804$_2$) is implemented as part of the memory 1506.

The graphics processing system of FIGS. 8 and 13 are shown as comprising a number of functional blocks. This is schematic only and is not intended to define a strict division between different logic elements of such entities. Each functional block may be provided in any suitable manner. It is to be understood that intermediate values described herein as being formed by a graphics processing unit need not be physically generated by the graphics processing unit at any point and may merely represent logical values which conveniently describe the processing performed by the graphics processing unit between its input and output.

The graphics processing units described herein may be embodied in hardware on an integrated circuit. The graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

There may be provided a method of manufacturing, at an integrated circuit manufacturing system, a graphics processing unit as described herein. There may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 16.

Figure 16:
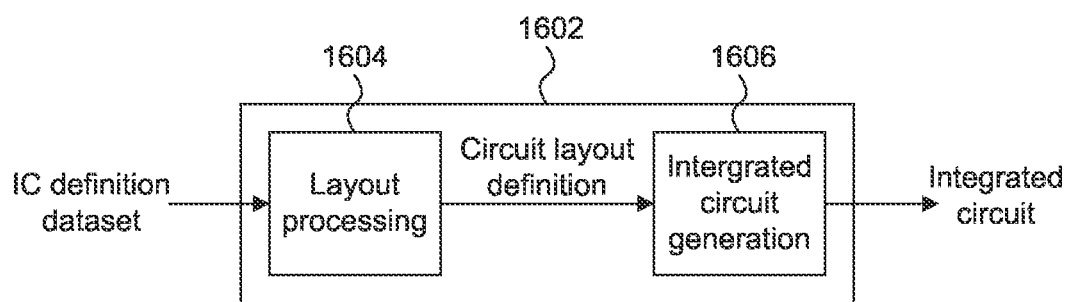
FIG. 16 shows an integrated circuit manufacturing system.

FIG. 16 shows an example of an integrated circuit (IC) manufacturing system 1602 which is configured to manufacture a graphics processing unit as described in any of the examples herein. In particular, the IC manufacturing system 1602 comprises a layout processing system 1604 and an integrated circuit generation system 1606. The IC manufacturing system 1602 is configured to receive an IC definition dataset (e.g. defining a graphics processing unitas described in any of the examples herein), process the IC definition dataset, and generate an IC according to the IC definition dataset (e.g. which embodies a graphics processing unitas described in any of the examples herein). The processing of the IC definition dataset configures the IC manufacturing system 1602 to manufacture an integrated circuit embodying a graphics processing unit as described in any of the examples herein.

The layout processing system 1604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1604 has determined the circuit layout it may output a circuit layout definition to the IC generation system 1606. A circuit layout definition may be, for example, a circuit layout description.

The IC generation system 1606 generates an IC according to the circuit layout definition, as is known in the art. For example, the IC generation system 1606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1606 may be in the form of computer-readable code which the IC generation system 1606 can use to form a suitable mask for use in generating an IC.

The different processes performed by the IC manufacturing system 1602 may be implemented all in one location, e.g. by one party. Alternatively, the IC manufacturing system 1602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 16 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 16, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems described herein may be embodied in hardware on an integrated circuit. The graphics processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing unit configured to process graphics data using a rendering space which is sub-divided into a plurality of tiles, the graphics processing unit comprising:
    a plurality of processing cores configured to render graphics data;
    cost indication logic configured to obtain, for each set of one or more tiles of a plurality of sets of one or more tiles of the rendering space, a cost indication from the set of one or more tiles, wherein the cost indication is a parameter which provides some measure of a likely cost of processing the set of one or more tiles;
    similarity indication logic configured to obtain similarity indications between sets of one or more tiles of the plurality of sets of one or more tiles of the rendering space, wherein the similarity indication between two sets of one or more tiles is indicative of a level of similarity between the two sets of tiles according to at least one processing metric; and
    scheduling logic configured to assign the sets of one or more tiles to the processing cores for rendering in dependence on the cost indications and the similarity indications;
    wherein the similarity indication logic is configured to:
    assign a group of one or more similarity indications to each of a plurality of sets of one or more tiles, each similarity indication in a group being indicative of a level of similarity between that set of one or more tiles and another set of one or more tiles; and/or
    assign to each of the plurality of sets of one or more tiles a plurality of similarity indications indicative of a level of similarity between that set of one or more tiles and other sets of one or more tiles located within a localised region of that set of one or more tiles.

2. The graphics processing unit as claimed in claim 1, wherein the similarity indication logic is configured to determine the similarity indications.

3. The graphics processing unit as claimed in claim 1, wherein the scheduling logic is configured to:
    assign the next set of one or more tiles to the processing cores according to a first scheduling order set by the cost indications if the similarity indications for the set of one or more tiles most recently assigned to the processing cores does not indicate that there is a level of similarity above a specified threshold between that set of one or more tiles and another set of one or more tiles yet to be assigned to the processing cores; and
    if the similarity indications for the set of one or more tiles most recently assigned to the processing cores indicates there is a level of similarity above the specified threshold between that set of one or more tiles and one or more other sets of one or more tiles yet to be assigned to the processing cores, assign as the next set of one or more tiles to the processing cores one of those other sets of one or more tiles.

4. The graphics processing unit as claimed in claim 3, wherein the scheduling logic is configured to:
    set the value of the specified threshold based on an average value of the cost indications for the render and/or
    vary the specified threshold during the render.

5. The graphics processing unit as claimed in claim 1, wherein the scheduling logic is configured to one or more of:
    assign a next set of one or more tiles to the processing cores according to a first scheduling order set by the cost indications or a second scheduling order set by the spatial order of the tiles in dependence on the similarity indications assigned to the set of one or more tiles most recently assigned to the processing cores; and
    assign the next set of one or more tiles to the processing cores according to the first scheduling order if the similarity indications assigned to the set of one or more tiles most recently assigned to the processing cores indicates a level of similarity between that set of one or more tiles and the other set of one or more tiles specified according to the spatial order of the tiles below a specified threshold; and to next assign to the processing cores the set of one or more tiles specified by the spatial ordering of the tiles if the similarity indications assigned to the set of one or more tiles most recently assigned to the processing cores indicates a level of similarity between that set of one or more tiles and the set of one or more tiles specified according to the spatial order of the tiles above the specified threshold.

6. The graphics processing unit as claimed in claim 1, wherein the at least one processing metric includes one or more of:
 a processing resource used to render a set of one or more tiles, and the similarity indication logic is configured to determine a similarity indication between two sets of one or more tiles based on a level of sharing of the processing resource between the two sets of one or more tiles; and
 graphical data content comprising at least one of: (i) primitives which are present within a set of one or more tiles, and (ii) textures which are to be used to render a set of one or more tiles.

7. The graphics processing unit as claimed in claim 6, wherein the processing resource is a set of one or more shader programs referenced by a set of one or more tiles.

8. The graphics processing unit as claimed in claim 7, wherein the similarity indication logic is configured to determine the level of sharing of the processing resource from the number of shader programs referenced by both of the two sets of one or more tiles.

9. The graphics processing unit as claimed in claim 1, wherein the similarity indication logic is configured to determine a similarity indication between two sets of one or more tiles from the cost indications for those two sets of one or more tiles.

10. The graphics processing unit as claimed in claim 1, wherein the cost indication logic is configured to determine a cost indication for a tile of the rendering space by combining scores associated with primitives which are present in the tile, wherein the score associated with a primitive is dependent upon an object type of an object of which the primitive is a part.

11. The graphics processing unit as claimed in claim 1, wherein the cost indication logic is configured to determine a cost indication for a tile of the rendering space based on one or more of the following factors:
 (i) a number of primitives in the tile;
 (ii) object types associated with the primitives in the tile;
 (iii) tile coverage area of the primitives in the tile;
 (iv) characteristics of one or more shader programs which are to be executed for rendering the primitives in the tile;
 (v) a user input; and
 (vi) a processing cost of a corresponding tile in a previous render.

12. The graphics processing unit as claimed in claim 11, wherein the characteristics of a shader program include one or more of:
 (i) a length of the shader program;
 (ii) an amount of resources or registers used by the shader program;
 (iii) whether the shader program includes conditional flow control;
 (iv) whether the shader program includes loops for which the number of repetitions is undefined at compile time; and
 (v) an amount of memory reads and/or writes used in the shader program.

13. The graphics processing unit as claimed in claim 1, wherein the sets of one or more tiles each comprise only a single tile or each comprise a plurality of tiles.

14. The graphics processing unit as claimed in claim 1, wherein the sets of one or more tiles each comprise a plurality of tiles, and wherein the cost indication logic is configured to:
 obtain a respective cost indication for each of the tiles of a set of tiles; and
 determine the cost indication for the set of tiles based on the cost indications of the tiles within that set.

15. The graphics processing unit as claimed in claim 1, wherein the scheduling logic is configured to one or more of:
 assign the next set of one or more tiles to the processing cores according to the first scheduling order if the similarity indications assigned to the set of one or more tiles most recently assigned to the processing cores indicates a level of similarity between that set of one or more tiles and the other set of one or more tiles specified according to the spatial order of the tiles below a specified threshold; and
 to next assign to the processing cores the set of one or more tiles specified by the spatial ordering of the tiles if the similarity indications assigned to the set of one or more tiles most recently assigned to the processing cores indicates a level of similarity between that set of one or more tiles and the set of one or more tiles specified according to the spatial order of the tiles above the specified threshold;
 wherein the scheduling logic is configured to:
 set the value of the specified threshold based on an average value of the cost indications for the render and/or
 vary the specified threshold during the render.

16. The graphics processing unit as claimed in claim 1, further comprising tiling logic configured to output, for each tile, an indication of primitives which are present in the tile.

17. The graphics processing unit as claimed in claim 1, wherein the graphics processing unit is embodied in hardware on an integrated circuit.

18. A method of processing graphics data in a graphics processing system which comprises a plurality of processing cores configured to render graphics data, the graphics processing system being configured to use a rendering space which is sub-divided into a plurality of tiles, the method comprising:
 obtaining, for each set of one or more tiles of a plurality of sets of one or more tiles of the rendering space, a cost indication from the set of one or more tiles, wherein the cost indication is a parameter which provides some measure of a likely cost of processing the set of one or more tiles;
 obtaining similarity indications between sets of one or more tiles of the plurality of sets of one or more tiles of the rendering space, wherein the similarity indication between two sets of one or more tiles is indicative of a level of similarity between the two sets of tiles according to at least one processing metric; and
 assigning the sets of one or more tiles to the processing cores for rendering in dependence on the cost indications and the similarity indications;
 the method further comprising:
 assigning a group of one or more similarity indications to each of a plurality of sets of one or more tiles, each similarity indication in a group being indicative of a level of similarity between that set of one or more tiles and another set of one or more tiles; and/or assigning to each of the plurality of sets of one or more tiles a plurality of similarity indications indicative of a level of similarity between that set of one or more tiles and other sets of one or more tiles located within a localised region of that set of one or more tiles.

19. A non-transitory computer readable storage medium having stored thereon an integrated circuit definition dataset that, when processed in an integrated circuit manufacturing system, configures the integrated circuit manufacturing system to manufacture a graphics processing unit configured to process graphics data using a rendering space which is sub-divided into a plurality of tiles, the graphics processing unit comprising:

- a plurality of processing cores configured to render graphics data;
- cost indication logic configured to obtain, for each set of one or more tiles of a plurality of sets of one or more tiles of the rendering space, a cost indication from the set of one or more tiles, wherein the cost indication is a parameter which provides some measure of a likely cost of processing the set of one or more tiles;
- similarity indication logic configured to obtain similarity indications between sets of one or more tiles of the plurality of sets of one or more tiles of the rendering space, wherein the similarity indication between two sets of one or more tiles is indicative of a level of similarity between the two sets of tiles according to at least one processing metric; and
- scheduling logic configured to assign the sets of one or more tiles to the processing cores for rendering in dependence on the cost indications and the similarity indications;

wherein the similarity indication logic is configured to:

assign a group of one or more similarity indications to each of a plurality of sets of one or more tiles, each similarity indication in a group being indicative of a level of similarity between that set of one or more tiles and another set of one or more tiles; and/or assign to each of the plurality of sets of one or more tiles a plurality of similarity indications indicative of a level of similarity between that set of one or more tiles and other sets of one or more tiles located within a localised region of that set of one or more tiles.

* * * * *